US010217145B1

(12) United States Patent
Ye et al.

(10) Patent No.: US 10,217,145 B1
(45) Date of Patent: Feb. 26, 2019

(54) PARTITIONED PRIVATE INTERCONNECTS TO PROVIDER NETWORKS

(71) Applicant: Amazon Technologies, Inc., Reno, NV (US)

(72) Inventors: Shuai Ye, Herndon, VA (US); Mark Edward Stalzer, Arlington, VA (US); Patrick Brigham Cullen, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 231 days.

(21) Appl. No.: 14/183,160

(22) Filed: Feb. 18, 2014

(51) Int. Cl.
*G06Q 30/04* (2012.01)
*H04L 12/26* (2006.01)

(52) U.S. Cl.
CPC ......... *G06Q 30/04* (2013.01); *H04L 43/0876* (2013.01)

(58) Field of Classification Search
USPC ......................................................... 705/34
See application file for complete search history.

(56) References Cited

U.S. PATENT DOCUMENTS

| | | | | |
|---|---|---|---|---|
| 6,792,464 | B2 * | 9/2004 | Hendrick | G06F 21/34 709/217 |
| 8,811,184 | B2 * | 8/2014 | Ong | H04L 41/0896 370/229 |
| 2010/0329265 | A1 * | 12/2010 | Lapuh | H04L 12/4645 370/395.53 |
| 2013/0031136 | A1 * | 1/2013 | Shah | G06F 17/30528 707/783 |
| 2014/0112343 | A1 * | 4/2014 | Lambeth | H04L 45/04 370/392 |

FOREIGN PATENT DOCUMENTS

| | | |
|---|---|---|
| JP | 2002232427 | 8/2002 |
| WO | 2010068630 | 6/2010 |
| WO | 2011049742 | 4/2011 |

OTHER PUBLICATIONS

U.S. Appl. No. 14/625,539, filed Feb. 18, 2015, Po-Chun Chen.
U.S. Appl. No. 14/625,537, filed Feb. 18, 2015, Po-Chun Chen.
U.S. Appl. No. 14/526,408, filed Oct. 28, 2014, Po-Chun Chen et al.
AWS Documentation, "Accept a Hosted Connection", Oct., 22, 2013, 1 page.

(Continued)

*Primary Examiner* — Paul Danneman
(74) *Attorney, Agent, or Firm* — Robert C. Kowert; Meyertons, Hood, Kivlin, Kowert & Goetzel, P.C.

(57) ABSTRACT

Methods and apparatus for partitioned private interconnects to provider networks are described. At least a portion of available bandwidth of a private physical interconnect between a provider network and a connectivity intermediary's network is designated as the bandwidth limit of an interconnect partition set up on behalf of a customer at the request of the intermediary. The intermediary's network comprises one or more devices to which at least one of the customer's devices is connected. Access to one or more resources of the provider network via the interconnect is enabled. Traffic monitoring results associated with the interconnect are used to enforce the designated bandwidth limit of the partition.

20 Claims, 13 Drawing Sheets

(56) References Cited

OTHER PUBLICATIONS

AWS Documentation, "Adding a Hardware Virtual Private Gateway to Your VPC", Oct. 15, 2013, pp. 1-6.
Amazon Web Services, "AWS Direct Connect; User Guide, API Version", Oct. 22, 2013, pp. 1-42.
Amazon Web Services, "Amazon Virtual Private Cloud, User Guide, API Version", Oct. 1, 2013, pp. 1-147.
AWS Documentation, "Welcome", Oct. 22, 2013, pp. 1-2.
U.S. Application Serial No.
U.S. Appl. No. 13/306,801, filed Nov. 29, 2011, Kevin Christopher Miller.
U.S. Appl. No. 13/306,775, filed Nov. 29, 2011, Kevin Christopher Miller.
U.S. Appl. No. 13/330,449, filed Dec. 19, 2011, Michael B. Furr.
U.S. Appl. No. 13/330,438, filed Dec. 19, 2011, Kevin Christopher Miller.
U.S. Appl. No. 13/335,465, filed Dec. 22, 2011, Andrew J. Doane.
U.S. Appl. No. 13/335,490, filed Jul. 23, 2013, Kevin Christopher Miller.

\* cited by examiner

PARTITIONED PRIVATE INTERCONNECTS TO PROVIDER NETWORKS

BACKGROUND

Many companies and other organizations operate computer networks that interconnect numerous computing systems to support their operations and the services they provide to their end customers distributed worldwide. For example, data centers housing significant numbers of interconnected computing systems have become commonplace, such as private data centers that are operated by and on behalf of a single organization, and public data centers that are operated by entities as businesses to provide computing resources to customers. In many cases providers set up large networks that may logically span several geographical regions or even countries, and may include numerous data centers with varying levels of services and facilities available, utilized together to provide a unified set of services to their end customers.

In some data centers that have been set up to provide computing and/or storage facilities to external customers, the set of resources at the data center may be dynamically divided into resource pools, with each pool being made available for exclusive use by a given customer for designated periods of time. There are a number of alternatives available for how the consumers of these facilities establish network connectivity to the resource pools that have been designated for their use. The customer requests may originate from a wide variety of devices—desktop personal computers, laptops, client-office servers, tablets, smart phones and the like. These devices may use either long-lasting network links (e.g., using a client office network with a T1 connection) to communicate with their proximate private network and/or the public Internet, or they may have transient connectivity (e.g., in the case where the customer uses a mobile smart phone). The proximate networks to which the customer devices are directly connected may in turn route request traffic to the provider network's data centers over a wide variety of paths. Such paths in many cases may have somewhat unpredictable performance, reliability and security characteristics.

For some casual types of service requests, such as a request from a customer to read a recent news article from a web-based news provider, a reasonable variation in responsiveness and an occasional dropped connection may be acceptable. However, for many business-related data transmissions, such as stock quote services and stock purchase order services provided by online stock traders, or for high-bandwidth software package deployments originating at a software development center, more stringent performance, reliability and security needs may exist. In such environments, a customer of the provider network may need a greater level of network isolation and control than is generally available over the public Internet. Some provider network operators may offer the ability to set up direct isolated physical links into their networks, but the constraints typically associated with such connections (e.g., the complex set of steps that have to be performed to establish connectivity, or the minimum bandwidth a customer may have to pay for in order to make use of the direct physical connections) may deter at least some customers.

Figure 1:
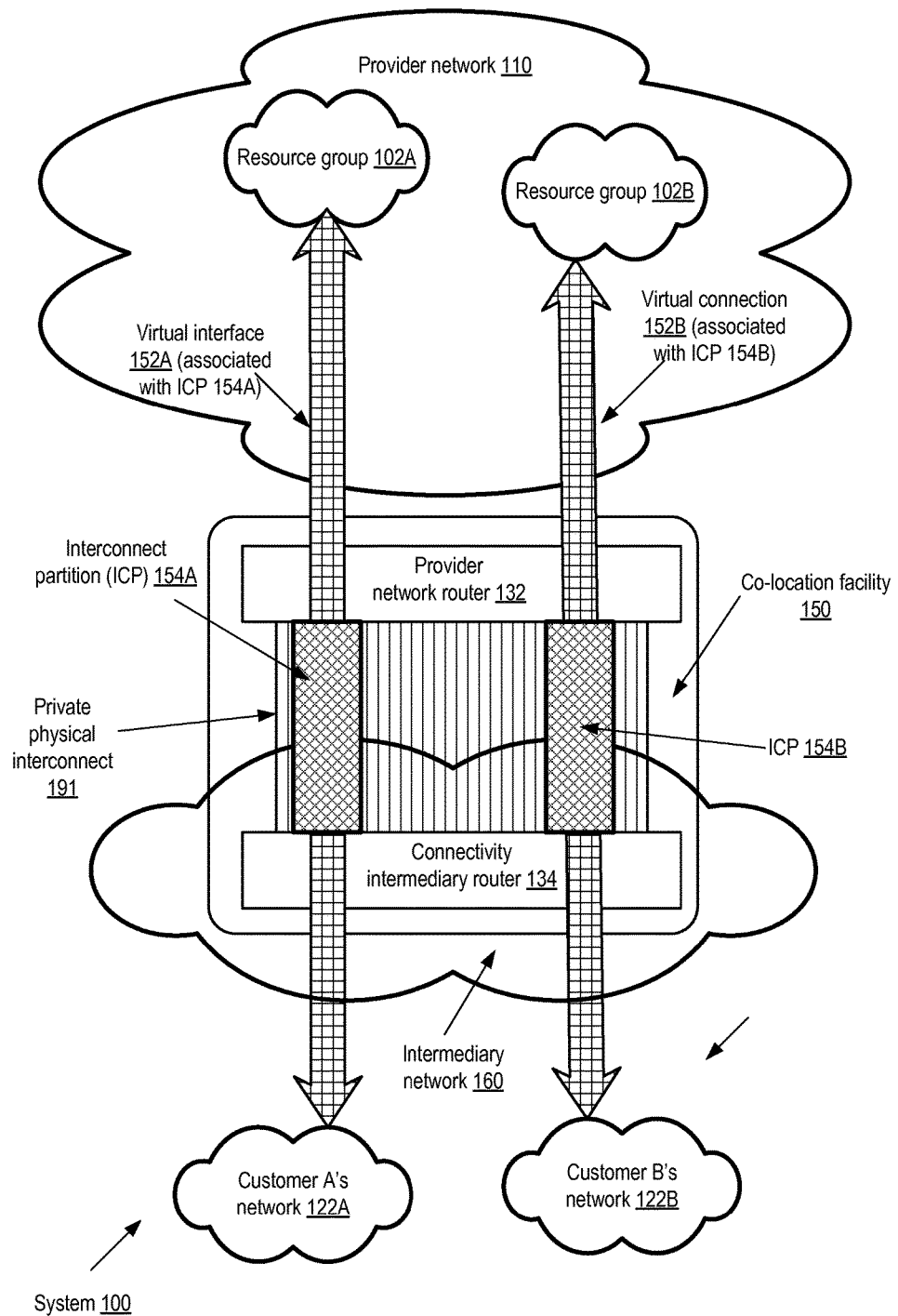
FIG. 1 illustrates an example system environment in which bandwidth capacity of a private physical interconnect may be distributed among several partitions, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for the configuration and use of partitioned private physical interconnects to provider networks are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. The term "multi-tenant" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. A provider network may support single-tenant services (such as for private cloud implementations) in some embodiments, either in addition to, or instead of, multi-tenant services. A given provider network may typically include several large data centers hosting various resource pools, such as collections of physical and/or virtualized computer servers, storage devices, networking equipment and the like, needed to implement, configure and distribute the infrastructure and services offered by the provider.

In order to extend the geographical areas over which its services can be accessed with desired levels of performance, reliability and security, an operator of a provider network may establish private network paths between its data centers and one or more routers that are physically located at an external facility. The facilities at which these routers are housed are termed "router co-location facilities" in this document, as they may sometimes house routers and other network equipment owned and/or managed by business entities other than the provider network's operator. In at least some embodiments, a given co-location facility may include a router belonging to or managed by the provider network operator, linked by a private physical interconnect (PPI) to another router belonging to or owned by a partner entity of the provider network, referred to herein as a "connectivity intermediary". A PPI may also be referred to as a "direct connect connection" or a "cross-connect" in some embodiments. The traffic flowing over the interconnect may be limited to network transfers on behalf of, or approved by, the connectivity intermediary; thus, the interconnect may be termed "private" in that it is not directly accessible from addresses or locations unapproved by the connectivity intermediary. A connectivity intermediary may also be referred to herein simply as an intermediary. Customers of the intermediary may be able to obtain access to the resources of the provider network via the private physical interconnect, e.g., using their own customer routers (or other network devices linked to the intermediary network) which may be located either at the same router co-location facility or elsewhere. In some cases a given customer of the intermediary may concurrently also be a customer of the provider network, and may wish to utilize the private physical interconnect for traffic between provider network resources assigned to the customer (such as compute instances, storage service nodes and the like) and external resources of the customer located outside the provider network.

In at least some embodiments, the provider network may support PPIs with only a few bandwidth levels—for example, either a 1 Gbit/sec (Gigabits per second) or a 10 Gbit/sec bandwidth capacity may be supported in one embodiment. The billing amounts associated with setting up and utilizing the private bandwidth capacity in such units may be non-trivial. It may sometimes also be the case that some customers or clients of the connectivity intermediary (at whose request the PPI has been set up) may only generate enough traffic to utilize a relatively small fraction of the bandwidth capacity supported for a PPI—e.g., one client may only need 100 Mbit/sec, while another may need no more than 250 Mbit/sec, when the minimum bandwidth capacity of a PPI is 1 Gbit/sec. Thus, for both cost-related reasons and bandwidth usage reasons, it may make sense to subdivide the bandwidth capacity of a private physical interconnect. Such a subdivision of the physical interconnect bandwidth may be accompanied in some embodiments by the implementation of a shared ownership model, in which the billing responsibilities for a single private physical interconnect may be shared among multiple entities, including for example several different customers of the interconnect intermediary that utilize the interconnect as well as the interconnect intermediary itself. Billing management for a shared physical interconnect may be handled using a variety of different approaches in different embodiments—e.g., the provider network may be responsible for generating respective billing amounts for the intermediary and the customers, or the intermediary may receive a bill from the provider network for the setup and use of the physical interconnect and determine separate billing amounts for the various customers utilizing the interconnect, for example.

In at least some embodiments, the business entities (e.g., customers of the connectivity intermediary that are not yet clients of the provider network) that wish to utilize the PPI but do not yet have client accounts at the provider network may be required to open respective client accounts with the provider network. Each such entity that wishes to have a designated portion of the PPI bandwidth reserved for exclusive use may be required to confirm acceptance of billing responsibility for their portion using a client account identifier and credentials, as described below, before the desired network traffic flow is enabled in at least some embodiments. Thus, an entity that wishes to utilize the dedicated bandwidth and isolated networking functionality afforded by the private physical interconnect may be able to collaborate with the connectivity intermediary and the provider network to obtain just the desired amount of connectivity, without having to pay for the entire bandwidth supported at a PPI as a whole. In some embodiments, several of the workflow tasks involved in enabling connectivity via the PPI, such as the configuration of virtual interfaces or virtual private gateways, may be handled by the connectivity intermediaries on behalf of their customers, thus reducing the administrative overhead for the customers. The functionality of subdividing the bandwidth capacity of a private physical interconnect may be termed "partitioning" the physical interconnect herein, and the portions of the interconnect bandwidth that are dedicated for each customer may be termed respective "interconnect partitions" (ICPs). A given private physical interconnect may be organized as one or more interconnect partitions, such that the sum of the bandwidth limits designated for the various partitions does not exceed the bandwidth capacity of the PPI as a whole. In some embodiments, a connectivity intermediary may reserve a subset or partition of the PPI bandwidth capacity for itself or for administrative purposes, and distribute the remainder of the capacity among one or more customers. Each customer may in general generate traffic in either direction over one or more interconnect partitions—e.g., resources inside the provider network may be accessed via one or more interconnect partitions from a plurality of external devices (e.g., servers or other computing devices) located at customer premises, and resources outside the provider network may be accessed from client-allocated devices (e.g., compute instances) within the provider network. It is noted that the terms "client" and "customer" may be used synonymously herein when referring to the business entities that utilize, and are billed for, the physical interconnect or its partitions. The devices from which clients/customers issue programmatic requests may accordingly also be referred to as client or customer devices.

According to one embodiment, a workflow similar to the following may be used to implement interconnect partitioning. In response to a request from a connectivity intermediary, a private physical interconnect may be configured between a provider network and an intermediary network (e.g., a set of devices including the intermediary's router) to which one or more customers of the connectivity intermediary have network access (e.g., via respective customer routers). At the request of the connectivity intermediary, at least a portion of a bandwidth capacity of the private physical interconnect may be designated as a bandwidth limit of a dedicated interconnect partition established on behalf of a particular customer. Metadata corresponding to the interconnect and/or to the partition may be generated and stored by an administrative or control-plane component of the provider network. Such an administrative component may be termed a connectivity coordinator herein. The connectivity coordinator may also be responsible for implementing various programmatic interfaces (e.g., web pages/consoles, application programming interfaces (APIs), command-line tools, graphical user interfaces (GUIs) and the like) to be used for interactions related to managing the PPIs and the interconnect partitions.

As mentioned above, before a customer is allowed to use an interconnect partition (ICP), in some embodiments the customer may be required to explicitly accept billing responsibility for the ICP. For example, the customer may log in to a web-based console using their client account and accept "ownership" of a fraction of the PPI, or the customer may utilize an API implemented by the connectivity coordinator to indicate or confirm acceptance of the billing responsibility. The billing responsibility may include upfront fees for establishing the ICP, ongoing traffic-dependent or usage-dependent charges, or both upfront and ongoing charges in various embodiments. After billing responsibility is confirmed/accepted, access between one or more resources of the provider network and one or more network devices of the particular customer may be enabled via the interconnect partition. In at least some embodiments, in order to enable access, one or more configuration steps such as the establishment of a virtual interface and/or one or more physical or virtual gateways may be required, as described below in further detail. After connectivity has been established, the traffic generated on behalf of the customer over the PPI may be monitored, e.g., by monitoring agents located at various parts of the provider network and/or in external networks. The results of the monitoring may be used to enforce the bandwidth limits associated with the customer's ICP—e.g., if a bandwidth limit of 100 Mbit/sec was designated for the ICP and the customer's traffic exceeds that limit, some number of packets may be dropped. The monitoring results may also be used to asynchronously generate billing amounts to be charged to the customer, e.g., for the usage-based portion of a bill generated at the end of each monthly or weekly billing cycle.

In some embodiments, a logically isolated network path called a virtual interface may be configured to enable connectivity over an ICP between some set of external devices and some set of provider network resources. Virtual interfaces of several different types may be configurable in some embodiments, depending on the desired extent of network isolation and network address visibility of the devices to be connected. For example, in some embodiments, a provider network may support establishment of "isolated virtual networks" (IVNs) on behalf of various customers. An IVN (which may also be referred to in some environments as a virtual private cloud or VPC) may comprise a collection of computing and/or other resources in a logically isolated section of the provider network, over which the customer is granted substantial control with respect to networking configuration. In some embodiments, for example, a customer may select the IP (Internet Protocol) address ranges to be used for the IVN resources, manage the creation of subnets within the IVN, and the configuration of route tables, gateways, etc. for the IVN. For at least some of the devices within an IVN in some embodiments, the network addresses may not be visible outside the IVN, at least by default. In order to enable connectivity between an IVN and the customer's external network (e.g., devices at the customer's data center or office premises) via an ICP, a virtual interface that is configured for use with private addresses (and is therefore termed a private virtual interface) and a virtual private gateway may be set up. A customer-side gateway (e.g., for traffic directed to or from the customer's external network) may also have to be set up in some implementations. In some embodiments one or more VPNs (virtual private network) may be configured between the customer's IVN and external networks (such as the customer's office network or the customer's data centers). In at least some embodiments, such VPNs may utilize secure networking protocols such as IPSec (Internet Protocol Security), SSL/TLS (Secure Sockets Layer/Transport Layer Security), DTLS (Datagram Transport Layer Security) and the like.

In at least some embodiments, a connectivity intermediary may partially or fully pre-configure one or more virtual private gateways to offer access from a customer's IVN to services implemented at external networks (e.g., network-accessible services offered by the intermediary or by other business entities partnering with the intermediary). A set of candidate virtual private gateways may be indicated programmatically to the customer in such embodiments (e.g., as part of a configuration interface for their IVN and/or as part of a service marketplace as described below), and the customer may select (and attach their IVN to) the particular gateway to obtain access to a desired service. Thus, in such an embodiment, the connectivity intermediary may perform a substantial portion of the configuration steps required (e.g., setting up the PPI, partitioning the PPI, setting up the virtual interface, and setting up the virtual private gateway) to allow a customer to utilize a network-accessible service implemented outside the provider network, from devices located within the customer's IVN. The ability to utilize a given service from an IVN with minimal configuration effort on the part of the customer may be promoted as a differentiating feature of the service. In at least one embodiment, after a customer has selected a particular virtual private gateway as a means to access a network-accessible service implemented outside the provider network, a few additional configuration operations may be performed on the basis of information exchanged between the customer and the connectivity intermediary or the provider network operator. For example, the customer may wish to indicate some network address ranges that should not be used for the service, because those addresses may already be in use within the customer's IVN. In such a scenario, the customer may provide one or more configuration preferences regarding the VPG or the service endpoints, and the intermediary may perform the requested configuration changes on the VPG or at service endpoints. Similarly, the connectivity intermediary and/or the provider network operator may provide some suggestions for configuration settings (e.g., firewall settings changes at the like) that may be needed to be performed at the customer's IVN, and the customer may make the necessary configuration modifications prior to accessing the service. Further details regarding IVNs, private virtual interfaces and gateways, and service marketplaces are provided below.

In contrast to IVNs, at least some of whose network addresses may be private, in some embodiments customers may wish to use the ICP for connectivity with publicly-accessible service nodes of the provider network. A number of different "public" network-accessible services whose nodes are typically accessible from anywhere on the Internet may be implemented in some embodiments at the provider network. For example, some compute instances (virtual machines set up by a computing service of the provider network), storage servers set up by a storage service, and/or database servers may be configured with public IP addresses reachable from (and advertised to) the Internet, and the client may wish to use an ICP to access such resources from an external client network. In such cases, a virtual interface that is configured for use with public IP addresses, and is therefore termed a public virtual interface, may be established rather than a private virtual interface.

For either type (public or private) of virtual interface to be configured, various parameters may have to be supplied to an administrative component of the provider network in some embodiments. These parameters may include, for example, one or more of: (a) a VLAN (virtual local area network) identifier or tag that complies with the Ethernet 802.1Q standard, (b) an Internet Protocol (IP) prefix, address range or address, (c) a Border Gateway Protocol (BGP) Autonomous System Number (ASN), or (d) a BGP key. In some embodiments, the connectivity intermediary may submit a request to the provider network (e.g., to the connectivity coordinator) to set up the appropriate type of virtual interface on behalf of a customer for whom an ICP is reserved. In other embodiments, the customer may submit a request to the provider network to establish the virtual network.

In at least some embodiments, a number of different programmatic interfaces may be implemented for PPI-related and ICP-related interactions between the provider network and the connectivity intermediaries or customers. Such programmatic interfaces may include, for example, APIs (or corresponding web pages with controls that result in API invocations) for querying/describing the status of PPIs and/or ICPs, creating (i.e., generating the metadata for managing) PPIs or ICPs, deleting PPIs or ICPs, and for confirming billing responsibilities for PPIs or ICPs. For example, a connectivity intermediary may submit a "describePPI" API request to obtain a list of ICPs configured at a specified PPI on behalf of various customers. It is noted that the connectivity coordinator that implements such APIs, and manages various PPI-related and ICP-related interactions with the connectivity intermediaries and the customers, may be implemented in a distributed manner in some embodiments, and may comprise a plurality of hardware and software devices distributed across one or more data centers.

Example System Environment with Partitioned Physical Interconnect

FIG. 1 illustrates an example system environment in which bandwidth capacity of a private physical interconnect may be distributed among several partitions, according to at least some embodiments. As shown, system 100 includes a provider network 110 with a plurality of resources associated with various network-accessible services. Resource groups 102 comprising one or more of the resources (e.g., group 102A or 102B), each of which may for example include compute instances or virtual machines of a computing service, storage devices of one or more storage services, or database nodes of a database service, may be allocated/assigned to respective customers. The customers may be referred to as the "owners" or "assignees" of the resource groups 102. For example, resource group 102A may be configured as an isolated virtual network (IVN) for a particular customer "A", and various networking configuration operations (such as the allocation of private IP addresses not advertised by default outside the IVN, subnet configurations, routing table entry management, and so on) may be performed for resource group by the customer. Resource group 102B may, for example, comprise one or more publicly-accessible service nodes, such as compute instances or storage servers with IP addresses accessible from the public Internet. Such IP addresses may be termed "public" IP addresses herein.

In order to enable connectivity between external customer networks 122 (e.g., customer A's network 122A, or customer B's network 122B) and resource groups 102, in the depicted embodiment a private physical interconnect (PPI) 191 may be established in response to a request from a connectivity intermediary (e.g., a partner of the provider network operator that has the necessary infrastructure and resources to offer network access to the provider network's resources and external networks to various customers). The PPI may include one or cables physically linking a pair of co-located routers, one belonging to or managed by the provider network (router 132), and one belonging to or managed by a connectivity intermediary (router 134). The connectivity intermediary's router 134 may be located within an intermediary network 160 to which the customer networks 122A and 122B already are connected, e.g., via respective customer routers (not shown in FIG. 1). The provider network router 132 and the connectivity intermediary router 134 may be located within a co-location facility 150 that may in some cases also be owned or managed by the connectivity intermediary.

When requesting the establishment of the PPI 191, the connectivity intermediary may have to choose a PPI bandwidth capacity from among a small set of discrete choices made available by the provider network, e.g., 1 Gbit/sec or 10 Gbit/sec. Various customers, such as customer A or customer B, may not need the entire bandwidth capacity, and may not be interested in paying for capacity that they do not need. Accordingly, in the depicted embodiment, the connectivity intermediary may request that respective portions of the total bandwidth capacity of PPI 191 be set aside for respective dedicated interconnect partitions (ICPs) 154 for various customers—e.g., some portion of the PPI bandwidth capacity be set aside for ICP 154A established on behalf of customer A, and another portion be set aside for ICP 154B established on behalf of customer B. An administrative component of the provider network (e.g., a connectivity coordinator, not shown in FIG. 1) may receive the requests to establish the ICPs, and generate the appropriate metadata in its configuration database.

Before enabling traffic to flow between the external customer networks 122 and respective resource groups 102, in at least some embodiments the provider network may obtain acceptance of billing responsibility for the ICPs from the corresponding customers. Thus, the provider network may use a shared ownership model for the PPI 191 in which, even though the PPI was initially configured at the request of the connectivity intermediary, the costs of using and/or establishing the PPI are shared among multiple parties. One or more programmatic interfaces may be implemented, enabling the customers A and B to accept ownership/billing responsibilities for the respective ICPs 154A and 154B being set up for them. The customers may be responsible for both one-time or upfront costs (e.g., setup costs for the ICP and/or the PPI as a whole) and recurring usage-based costs (e.g., billing amounts based on the traffic that flows over the PPI on behalf of the customer).

After the billing responsibility for a given ICP 154 has been accepted, traffic flow may be enabled between the corresponding external customer network 122 and one or more resource groups 102 of the provider network (e.g., the appropriate routing table changes and the like may be implemented and propagated to enable traffic to flow between resource group 102A and client network 122A, and between resource group 102B and client network 122B). Traffic flowing between the resource groups 102 and the external networks 122 via the PPI 191 may be monitored, and the metrics collected may be used to enforce the bandwidth limits on the ICPs as well as for generating billing amounts.

In the depicted embodiment, respective virtual interfaces 152 may have to be configured corresponding each of the ICPs in order to enable traffic flow—e.g., virtual interface 152A may be configured for ICP 154A, and virtual interface 152B may be configured for ICP 154B. Setting up a virtual interface may involve providing, by the requester of the virtual interface, a VLAN (virtual local area network) tag in accordance with a networking standard (such as the IEEE 802.1Q standard) in some embodiments. In accordance with the standard, the tag provided for a virtual interface 152 may have to be included in the network frames transmitted, and the tags may be used by networking devices such as bridges, switches and routers to manage the transmission and routing of the frames. In addition, various other parameters may also have to be used for virtual interface configuration in at least some embodiments, such as an Internet Protocol (IP) address prefix or set of prefixes, a Border Gateway Protocol (BGP) Autonomous System Number (ASN), or a BGP key. BGP is an example of a commonly-used standardized exterior gateway protocol for exchanging routing and reachability information between Autonomous Systems (registered collections of connected IP routing prefixes under the control of respective network operators that each present a common defined routing policy). In some embodiments, parameters for protocols other than BGP may be used for configuring virtual interfaces.

In one embodiment, configuration of the virtual interface 152 for a given customer may be initiated at the request of the connectivity intermediary—e.g., the connectivity intermediary may submit a virtual interface configuration request to the provider network. In other embodiments, the customer may be responsible for initiating the configuration of the virtual interface, e.g., after the customer has made a decision to accept billing responsibility, a request to configure the virtual interface may be transmitted to the provider network programmatically by the customer. In some embodiments in which the resource group 102 comprises an IVN, the customer may also have to programmatically select and/or attach a virtual private gateway to enable traffic flow to the IVN, and/or request a propagation of one or more route table entries to a target virtual private gateway. Customers and/or the intermediary may also be required to configure external gateways (e.g., physical or virtual gateways associated with thy external networks 122) in some embodiments.

Various programmatic interfaces for configuring, deleting and querying the status of the PPI and/or ICP may be made available to the customers and the connectivity intermediary by the provider network in different embodiments. In one embodiment, different sets of APIs or console-based interfaces may be provided to the customers than are provided to the connectivity intermediaries. In another embodiment, a common set of programmatic interfaces may be used by the customers as well as the intermediaries.

Figure 2:
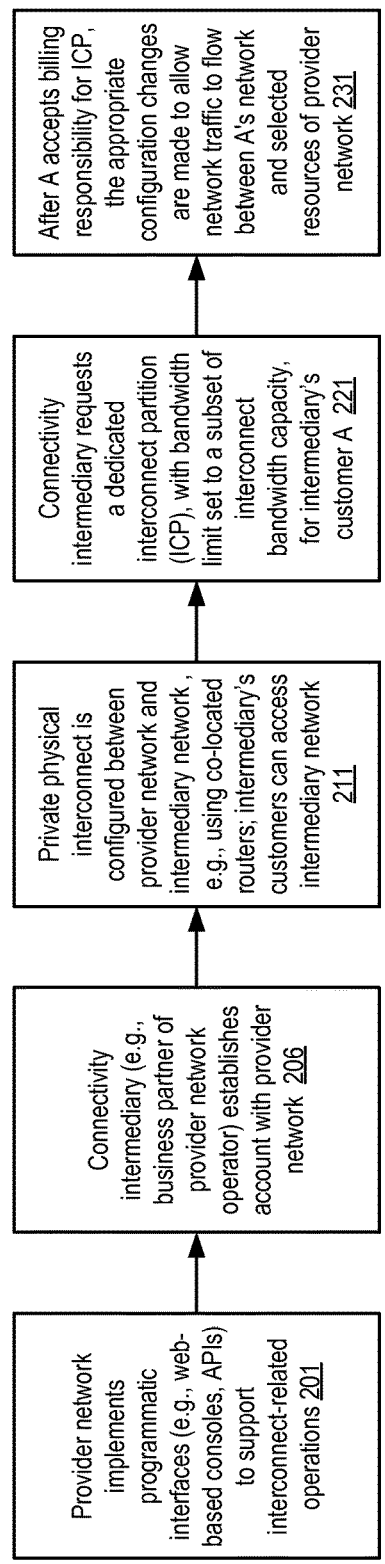
FIG. 2 provides a high level overview of steps that may be taken to establish and configure dedicated interconnect partitions, according to at least some embodiments.

FIG. 2 provides a high level overview of steps that may be taken to establish and configure dedicated interconnect partitions, according to at least some embodiments, according to at least some embodiments. As shown in the entry labeled 201 in FIG. 2, various programmatic interfaces defining a set of connectivity-related operations available to customers of the provider network 110 and/or to connectivity intermediaries may be provided. The set of available operations may include, for example, operations to create, configure, query, retrieve, update or delete metadata objects representing private physical interconnects, interconnect partitions, virtual interfaces, virtual private gateways and the like in some implementations. In addition, various interfaces to enable the creation of client accounts and to accept billing responsibility or ownership for various networking-related objects may also be implemented in some embodiments. The available operations may be exposed via application programming interfaces (APIs) in any of a variety of standard specifications or programming languages, such as Web Services Description Language (WSDL), XML, Java, C, C++, Python, Perl, or derivatives thereof, in some environments, such that connectivity intermediaries may interact with the provider network programmatically by issuing method calls, function calls and the like. In other environments, a more user-friendly interface such as a console comprising a collection of web pages may also or instead be provided. In one implementation, the provider network operator may for example publish a set of documents (similar to Javadocs in a case where Java or a Java-like programming language is used) that provide an exhaustive list of APIs, and may expose a frequently used subset of connectivity-related operations via a web page or pages. Other types of interfaces, such as command-line tools, independently installable graphical user interfaces (GUIs) (i.e., GUIs that do not rely on Web pages and HTTP-based interactions), thick clients, electronic mail, or messaging protocols, may be used in isolation or in combination to support the PPI and ICP related functions in various embodiments. In some cases the interface may consist of multiple layers, where one layer of interface may invoke another, and one or more of the layers may be exposed for direct client interactions. In one embodiment, the connectivity coordinator may provide a "Getting Started Guide" or some other similar documentation that may provide examples of how the interface may be used.

As shown in element 206, a connectivity intermediary that wishes to partner with the provider network operator to provide network access to various resources and services of the provider network may establish a client account using one of the programmatic interfaces. A private physical interconnect 191 may be configured between the provider network and the intermediary's network (element 211 of FIG. 2), e.g., using a co-located pair of routers as shown in FIG. 1. In at least some cases, some of the existing customers of the connectivity intermediary, who may wish to access the provider network services, may already have access to the intermediary network. In other cases, new customers of the intermediary may establish access to the intermediary's network, e.g., using respective customer routers which may or may not be co-located with the router pair used for the PPI. In at least some embodiments, any business entity (such as customers of the connectivity intermediary) for which connectivity is to be established via the PPI to the provider network may be required to set up a client account with the provider network, e.g., to facilitate billing and the establishment of service level agreements.

As shown in element 216, the connectivity intermediary may submit a request to configure a dedicated interconnect partition (ICP) for a particular customer A, for which a portion of the bandwidth capacity of the PPI may be set aside for exclusive use. Thus, for example, if the PPI has a bandwidth capacity of 10 Gbit/sec, the connectivity intermediary may request an ICP with a dedicated 1 Gbit/sec bandwidth available to customer A alone. The provider network may generate the appropriate metadata within its configuration database to manage the ICP. In at least some embodiments, the provider network may require the customer A to accept billing responsibility for the setup and/or continuing use of the ICP. After A accepts the billing responsibility, as indicated in element 221 of FIG. 2, network traffic over the PPI may be enabled (e.g., by making and propagating the appropriate networking configuration changes at various networking device such as routers, switches, gateways and the like) between the customer's external network and a targeted set of resources within the provider network. Depending on the types of resources from and to which connectivity is to be established, additional configuration steps not shown in FIG. 2 (but described in further detail below) may be required, such as the configuration of virtual interfaces and/or gateways.

Interactions for Configuring Interconnects and Partitions

Figure 3:
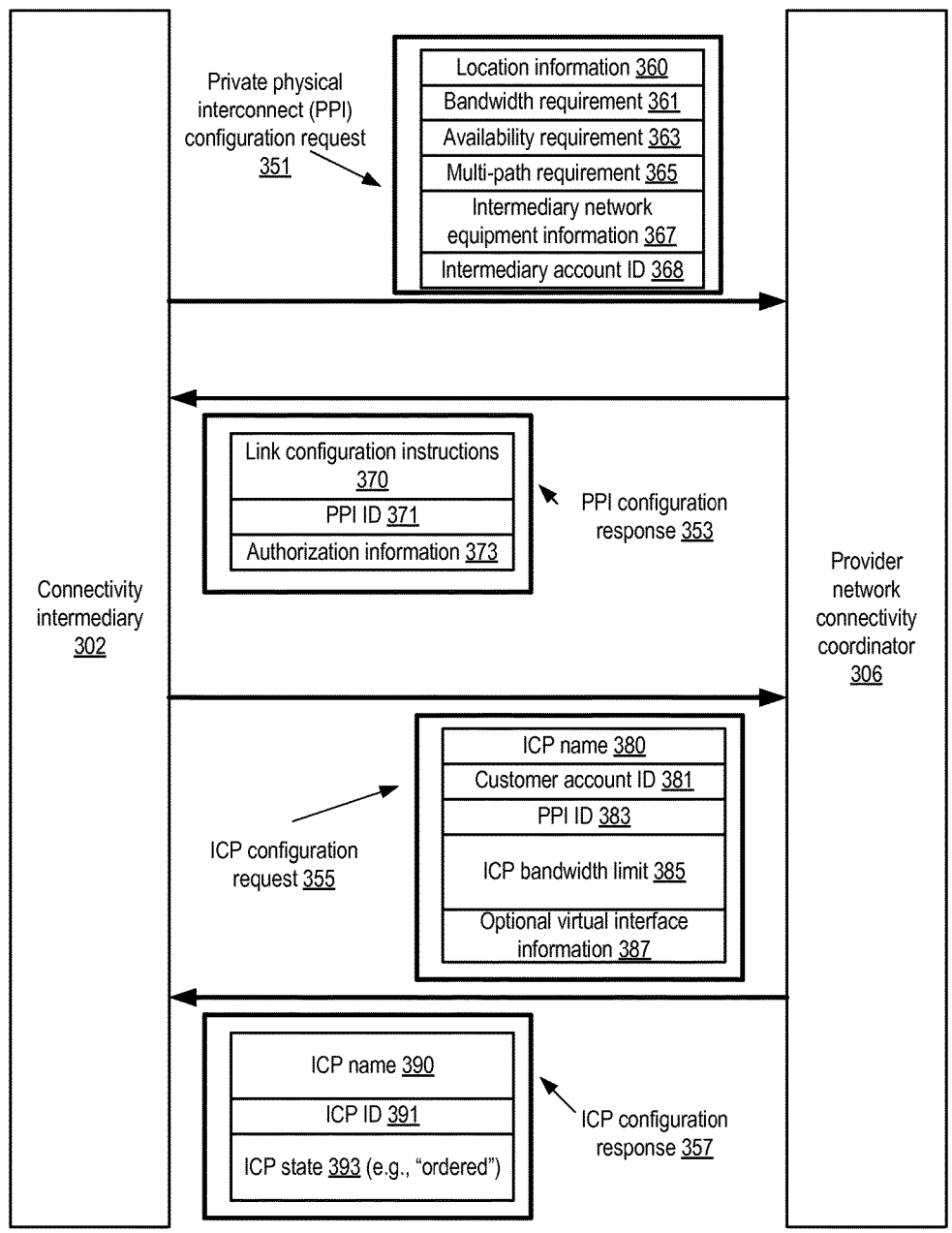
FIG. 3 illustrates example interactions between a connectivity intermediary and a provider network to configure an interconnect partition, according to at least some embodiments.

FIG. 3 illustrates example interactions between a connectivity intermediary 302 and a provider network to configure an interconnect partition, according to at least some embodiments. In the depicted embodiment, the private physical interconnect (PPI) itself may be configured first, and then additional interactions may be required to configure the interconnect partition (ICP). One or more programmatic interfaces for connectivity-related interactions may be implemented by an administrative component of the provider network such as connectivity coordinator 306 in various embodiments. As shown, the PPI configuration request 351 may comprise location information 360, bandwidth requirement 361, availability requirement 363, multi-path requirement 365, intermediary network equipment information 367, and intermediary account identifier 368 (i.e., the client account established for the intermediary at the provider network). Not all these elements may be required in the PPI configuration request; any combination or subset of these and other elements may be included in the requests in various embodiments.

The location information 360 may include details of a physical location at which the cross connect or PPI is desired: for example a street address where an intermediary router 134 currently exists or where such a router may need to be set up. In some implementations the intermediary 302 may specify a desired bandwidth for the PPI via bandwidth requirement 361. The intermediary may choose from among a discrete set of bandwidth choices such as 500 Mbit/sec, 1 Gbit/sec or 10 Gbit/sec, where the choices may be derived from the details of the specific networking hardware available for establishing a physical link. For example, at some router co-location facilities, the choices for physical links may include 1 Gbit/sec 1000BASE-LX (1310 nm) single-mode fiber connections over single-mode fiber, and 10 Gbit/sec 10GBASE-LR (1310 nm) single-mode fiber connections over single-mode fiber, and the connectivity coordinator 306 may accordingly allow the intermediary to choose between the 1 Gbit/sec option and the 10 Gbit/sec option. In other cases the intermediary may be allowed to request any arbitrary bandwidth and the connectivity coordinator 306 may respond to the request by indicating the bandwidth it is able or willing to provide. In another implementation, the connectivity coordinator may indicate that more than one physical link may be needed—e.g., if the customer requests 20 Gbit/sec and the maximum bandwidth available over a single cable is 10 Gbit/sec. It may also be possible to set up multiple physical links distributed over different routers (or even different co-location facilities) in response to a single PPI configuration request 351—e.g., if a particular intermediary has access to multiple routers at the same facility or at different co-location facilities, one or more PPIs may be set up for each router.

In some embodiments the connectivity intermediary may also provide an availability requirement 363 and/or a multi-path requirement 365 as part of the request 351. The availability requirement may be expressible in any of various metrics such as desired maximum network outage limits (e.g., one hour per year maximum outage time) or mean time between outages. A multi-path requirement 365 may indicate the number of physical links that should be set up between a provider network router and an intermediary's router. Multiple physical links may for example be requested for performance (e.g., so that traffic may be load-balanced or otherwise distributed over multiple physical paths, thereby reducing network congestion), for higher availability (e.g., by providing multiple paths, an alternate path may be available as a backup path in case of a failure at one of the physical links), or a combination of performance and availability reasons. In addition to specifying how many physical links are needed, a client may also specify the manner in which traffic is to be distributed among them. In a case where two paths are requested, for example, the client may specify whether they should be established in an active/active mode (e.g., where Border Gateway Protocol (BGP) multipathing is used to balance load across the two links, and in case of a failure, one link takes over the other's traffic), or in active/standby mode where only one of the links is in use at a time, and the second link is activated only in the event of a failure at the first link. Default choices (e.g., active/active) may be used in some implementations, so that the intermediary need not explicitly specify the type of multi-path setup. In some cases, indicating a multi-path requirement 365 may negate the need for (or contradict) an availability requirement 363, so the connectivity intermediary 302 may be allowed to specify only one of these two types of options.

In one embodiment, in order for example to further simplify the tasks that the intermediary may need to do to establish connectivity at their end, or to optimize performance, the connectivity coordinator 306 may also be able to provide configuration instructions, suggestions, and/or preferred settings for the specific type of networking equipment that the intermediary may have. In such an environment, an intermediary may provide network equipment information 367 to connectivity coordinator 306, which may for example consult a database of configuration data to look up configuration instructions for the equipment, and provide configuration suggestions or instructions to the intermediary. If equipment information 367 indicates that the intermediary uses a particular type or class of router from a particular vendor (e.g., a Cisco router, a Juniper router, or a Yamaha router), for example, the connectivity coordinator may be able to provide vendor-specific configuration hints for the particular type of router or for a particular version of software running on that particular router. Such hints may include examples of how to configure or verify BGP settings, tunneling-related settings, IKE (Internet Key Exchange) settings, and may also include instructions on how to test that the particular vendor's device is operating effectively. Troubleshooting hints and/or tuning hints such as preferred buffer sizes and the like that may be vendor-specific and/or device-specific may also be provided by connectivity coordinator 306 in some embodiments. Since, at least in some environments, the provider network 110 may have a large number of partners and customers using a wide variety of networking equipment, the connectivity coordinator 306 may be able to build up a knowledge base covering a wide variety of networking equipment configurations, the kinds of settings that work best with the provider network's own equipment, and so on, which may be very helpful to the partners or customers. As noted above, the client account 368 of the intermediary may be included in PPI configuration request 351 to enable the connectivity provider to identify the business entity that is to be designated the default owner of the PPI (pending the acceptance by other customers of ownership of ICPs of the PPI as described below). In various embodiments information similar to that shown in request 351 may be communicated in multiple steps to the connectivity coordinator 306—e.g., first location information and desired bandwidth may be communicated, then the connectivity coordinator may provide a response with a list of possible options, and then from among the possible options the intermediary may choose one option and provide additional specifications in subsequent messages.

After the appropriate metadata for the PPI has been generated and stored, the connectivity coordinator may provide a configuration response 353 to the intermediary's configuration request 351 in some embodiments. The response may include, for example, a PPI identifier 371 for the newly created PPI, link configuration instructions 370 and authorization information 373. The link configuration instructions 370 may for example pinpoint the exact physical coordinates where a cable originating from an intermediary router is to be attached: e.g., a physical port (e.g., "port 3" or "the third port from the left"), a cage identifier, a rack identifier, and a patch panel identifier may be included for the cable. In addition, in some cases device-specific hints or instructions may be provided for the particular type of networking equipment being used. Authorization information 373 may include a legally-binding agreement to allow a technician to access the provider network router, for example. After the physical link is established between the two routers, in at least some embodiments some number of tests may be run (by the connectivity coordinator, the intermediary, or both) to ensure that the PPI is working as intended.

The intermediary may subsequently submit an ICP configuration request 355, for enabling connectivity between a particular customer and the provider network, to the connectivity provider in some embodiments. The ICP configuration request 355 may include, for example, an ICP name 380, the account identifier 381 of the customer for whom the ICP is being requested, the PPI identifier 383, and an ICP bandwidth limit that is a portion of the currently-available bandwidth capacity of the PPI. (For example, if the intermediary has already dedicated 700 Mbit/sec of a 1 Gb/sec PPI bandwidth capacity for other ICPs, the maximum bandwidth limit allowed for the new ICP may be 300 Mbit/sec.) In some embodiment, if the connectivity intermediary has already partially or fully configured a virtual interface on behalf of the customer (as described below in the context of FIG. 4a) the ICP configuration request may include optional virtual interface information 387.

Figure 5:
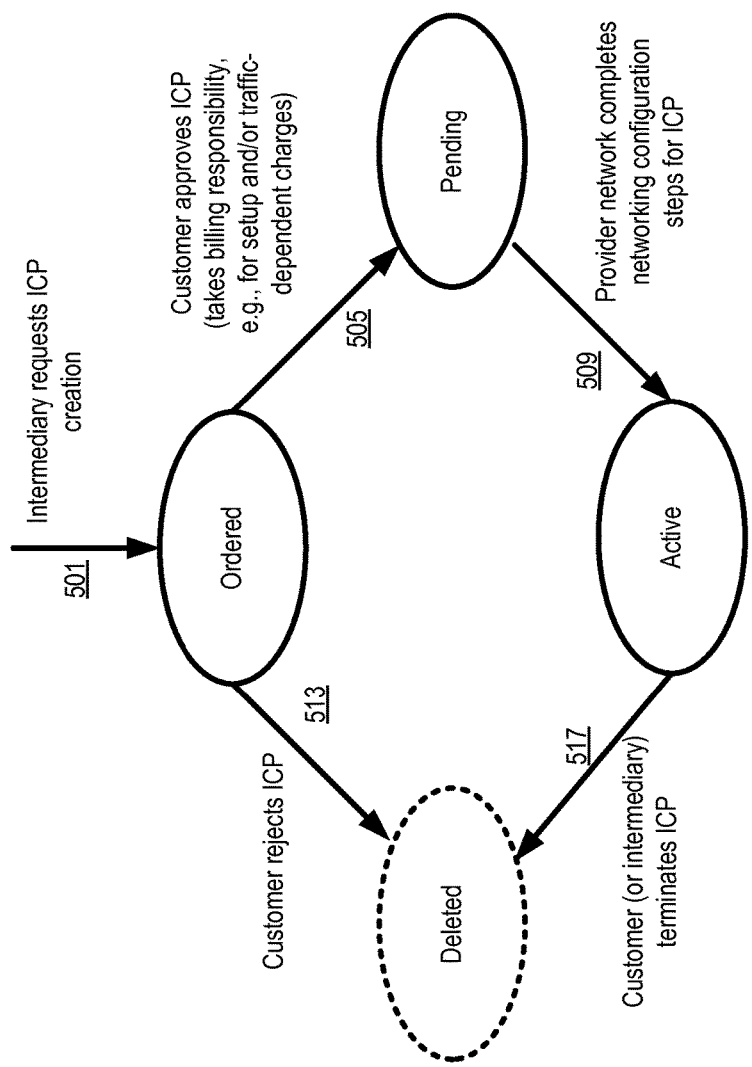
FIG. 5 illustrates examples of state transitions of an interconnect partition, according to at least some embodiments.

If the ICP configuration is successful (i.e., if metadata corresponding to the requested ICP is successfully generated and stored at the provider network), the connectivity coordinator 306 may provide an ICP configuration response 357. The response may confirm the ICP name 357, provide a newly-generated ICP identifier 391 and in at least some embodiments, indicate a current state 393 of the ICP (e.g., an "ordered" state, indicating that the ICP has not yet been activated and that the connectivity coordinator is awaiting customer acceptance of billing responsibility for it). Examples of typical state transitions during an ICP lifetime are shown in FIG. 5 and described in detail below.

Figure 4A:
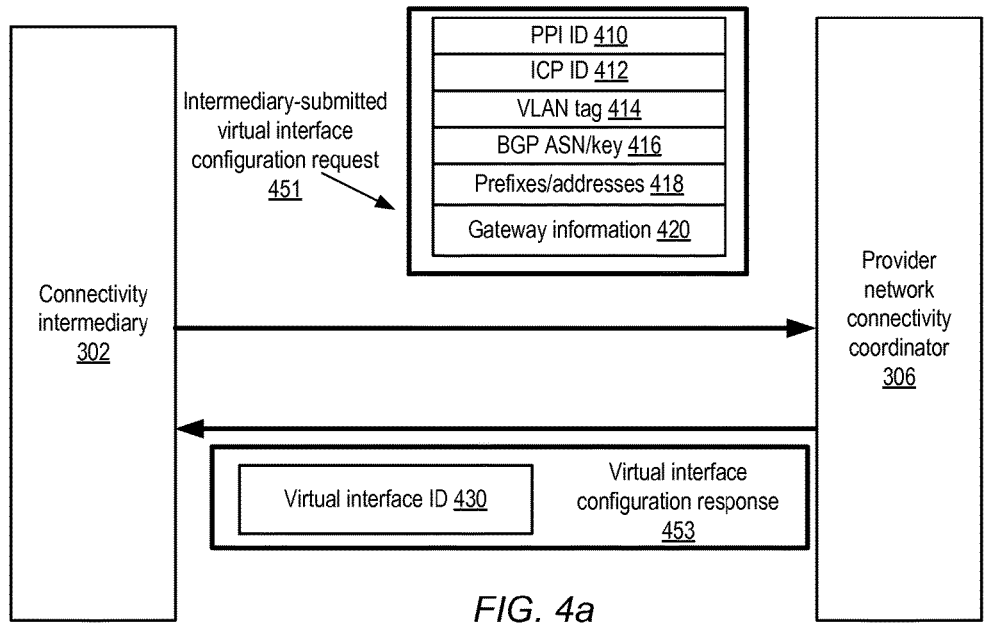
FIG. 4a illustrates example interactions between a connectivity intermediary and a provider network to configure a virtual interface associated with an interconnect partition, according to at least some embodiments.
Figure 4B:
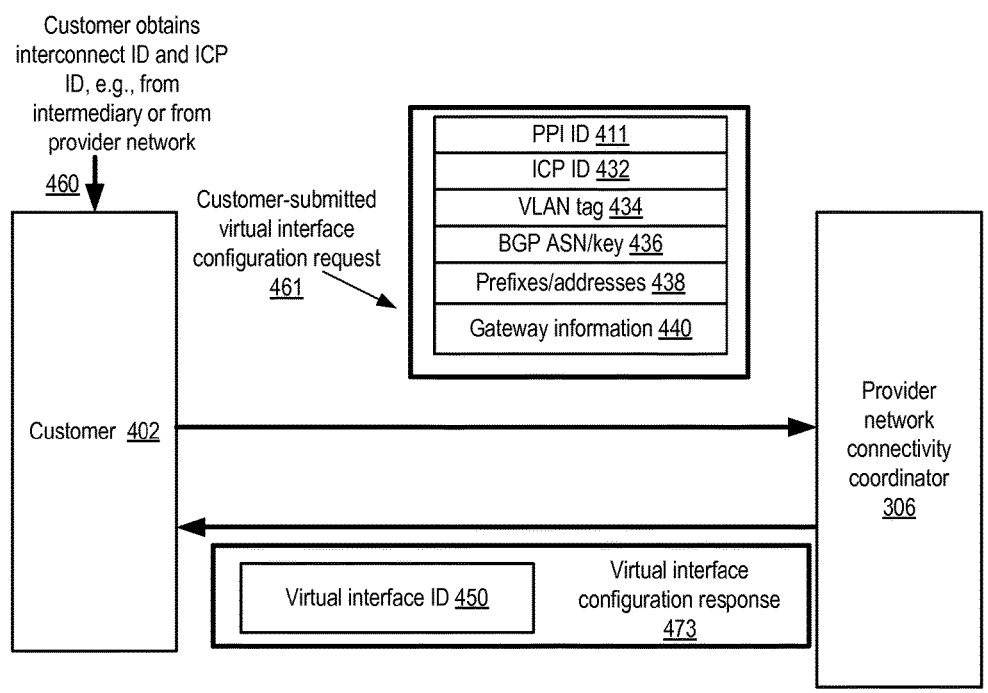
FIG. 4b illustrates example interactions between a customer or client on whose behalf an interconnect partition has been established, and a provider network, to configure a virtual interface associated with the interconnect partition, according to at least some embodiments.

As described earlier, in at least some embodiments a virtual interface may have to be configured for traffic associated with an ICP to flow between a network device external to the provider network, and some set of resources within the provider network. A virtual interface may allow the isolation or segregation of network packets associated with different ICPs of the same PPI, e.g., using respective VLAN tags corresponding to each virtual interface and inserted into the transmitted network packets. In various embodiments, virtual interface configuration may be initiated by the connectivity intermediary, the customer that is to utilize the ICP, or by either the intermediary or the customer. FIG. 4a illustrates example interactions between a connectivity intermediary and a provider network to configure a virtual interface associated with an interconnect partition, according to at least some embodiments. FIG. 4b illustrates similar example interactions between a customer or client on whose behalf an interconnect partition has been established, and a provider network, to configure a virtual interface associated with the interconnect partition, according to at least some embodiments.

As shown in FIG. 4a, an intermediary-submitted virtual interface configuration request may include some combination of the following in the depicted embodiment: a PPI identifier 410 of the interconnect to be used, an ICP identifier 412 of the partition with which the virtual interface is to be associated, a VLAN tag 414, BGP ASN and/or key information 416, public or private network prefixes or addresses 418, gateway information 420 and/or pairing information 422. As mentioned earlier, connectivity coordinator 306 may require a unique VLAN tag 414 for each virtual interface in some embodiments, so that the network packets associated with that virtual interface can be distinguished by network devices such as routers, switches and the like. In one implementation the VLAN tag 414 may be required to comply with a standard, such as the IEEE 802.1Q standard. The intermediary may also be required to provide a BGP Autonomous System Number (ASN) in some embodiments.

As indicated earlier, an Autonomous System (AS) is a collection of connected Internet Protocol (IP) routing prefixes under the control of one or more network operators that presents a common, clearly defined routing policy to the Internet. A unique ASN is typically allocated to each AS for use in BGP routing. The ASN provided by the intermediary may be public (i.e. may be exposed to various routers of the public Internet) or private (exposed only to routers of the provider network 110 and the intermediary or customer networks), depending on the type of connectivity desired. The intermediary may also provide a set of network prefixes 418 to be advertised for the virtual interface, e.g., in accordance with BGP or another routing protocol. Gateway information 420 may be provided for access to the customer's isolated virtual network (comprising resources within the provider network), e.g., via a VPN (virtual private network) to the customer network, in some embodiments. In some embodiments Multiple Protocol Label Switching (MPLS) techniques may be used to implement logical network isolation. While the constituent elements illustrated in FIG. 4a may be applicable in environments where BGP and related protocols are in use, in other embodiments other network isolation mechanisms (e.g. any other techniques usable for connecting to virtual private clouds or VPNs) may be supplied by the intermediary or the customer and used by connectivity provider for logical network isolation.

A response 453 may be provided to the intermediary's virtual interface configuration request, indicating (if the configuration was successful) an identifier of the newly-created virtual interface. Such a response may be provided after the appropriate networking configuration operations (such as changes to various routing tables) have been completed and/or propagated in some embodiments. As indicated in FIG. 4b, in some embodiments a customer (rather than the connectivity intermediary) may submit a virtual interface configuration request 461 to the connectivity coordinator 306. Similar information may be included in at least some embodiments within the customer-submitted virtual interface configuration request as is included in the intermediary-submitted request 451 of FIG. 4a. In some embodiments, the customer may be provided at least a subset of the information needed for the parameters of configuration request 461, e.g., the PPI ID and/or the ICP ID may be provided to the customer programmatically by the intermediary or the connectivity coordinator as indicated by arrow 460. A response 473 analogous to response 453 may be provided to the customer's virtual interface configuration request 461, with an identifier of the newly-created virtual interface. Whether a given virtual interface is "private" or "public" may be determined by parameters included in the virtual interface configuration request in some embodiments—e.g., if private address/prefixes not exposed to the public Internet are included in the request, a private virtual interface may be created. In other embodiments, the virtual interface creation request may include a parameter indicating whether a private or public virtual interface is being requested. The successful completion of the virtual interface configuration may be followed by tests to confirm that traffic flows as expected over the PPI in some embodiments, e.g., packet transfer tests may be initiated by the provider network, the connectivity intermediary and/or the customer to verify the desired connectivity.

Interconnect Partition State Transitions

FIG. 5 illustrates examples of state transitions of an interconnect partition, according to at least some embodiments. When a connectivity intermediary requests a creation of an ICP (e.g., via a request similar to ICP configuration request 355 of FIG. 3), as indicated by arrow 501 in FIG. 5, the connectivity coordinator 306 may initially place the ICP in an "ordered" state, indicating that an order for creating the ICP has been received and at least partially processed. However, an ICP in an ordered state may not yet be fully configured for network traffic. In the depicted embodiment, two state transitions may be required before the ICP is fully activated. First, as indicated by arrow 505, the customer on whose behalf the ICP is established may have to "accept" the ICP, i.e., take billing responsibility for the setup and/or traffic-related costs associated with the ICP. The ICP may then transition to a "pending" state in the depicted embodiment, indicating that it has been approved but is still not yet active. If the customer decides to reject the ICP instead of accepting it, as indicated by arrow 513, the ICP may be deleted or removed from the metadata database maintained by the connectivity coordinator in the depicted embodiment.

As described above, a virtual interface may have to be configured in order for traffic to flow between the external network and internal provider network resources intended to be linked via the ICP in at least some embodiments. In other embodiments, a virtual private gateway may also have to be attached to the virtual interface to enable access to private addresses of the provider network resource set. When these or similar configuration activities are completed, e.g., after the appropriate networking configuration changes have been made at various networking devices inside and/or outside the provider network, the ICP may be moved to the "active" state, as indicated by arrow 509. The ICP may remain in "active" state for as long as the provider network, the intermediary and/or the customer desire. In some embodiments, either the customer or the intermediary may "terminate" the ICP at any point, as indicated by arrow 517, in which case the corresponding metadata may be removed from the connectivity coordinator's database. In at least some implementations, the customer that has accepted billing responsibility for the ICP may have to agree to delete/terminate the ICP, and the intermediary may not be permitted to do so unilaterally. It is noted that the state transitions between "ordered", "pending" and "active" correspond to normal (i.e., error-free) operating conditions, and that additional states such as "down" or "failed" may be reached from several or all of the illustrated states in the event of a planned or unplanned shutdown of an IPC or a PPI in at least some embodiments. In one embodiment, the ICP may move from the "ordered" state to the "active" state in a single transition that encompasses the acceptance of billing responsibility by the customer as well as the completion of networking configuration changes such as those described above.

Public and Private Virtual Interfaces

Figure 6:
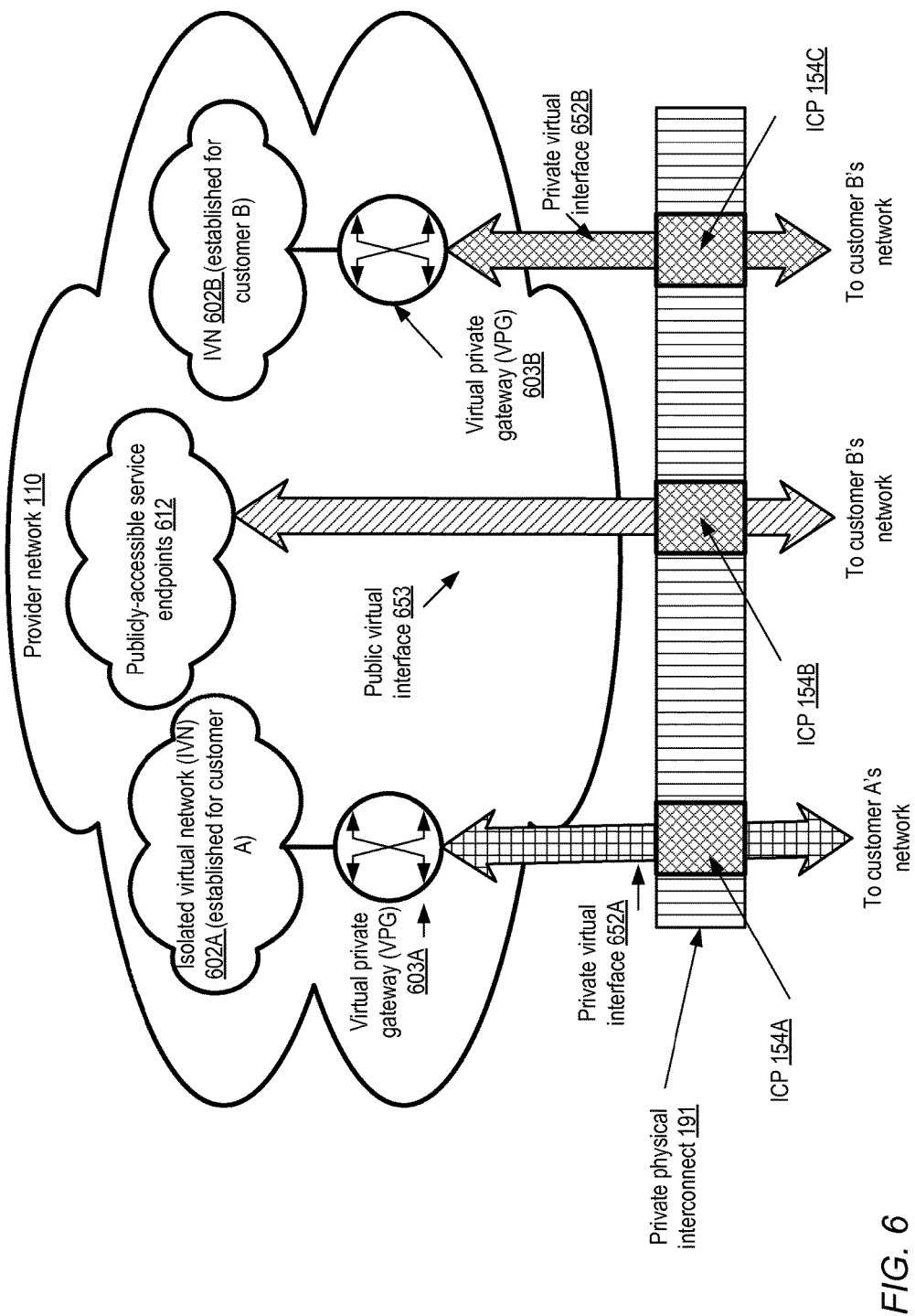
FIG. 6 illustrates examples of private and public virtual interfaces that may be associated with respective interconnect partitions of a private physical interconnect, according to at least some embodiments.

FIG. 6 illustrates examples of private and public virtual interfaces that may be associated with respective interconnect partitions of a private physical interconnect, according to at least some embodiments. As shown, three interconnect partitions, ICP 154A, 154B and 154C have been configured at the same private physical interconnect 191 linked to provider network 110. The co-located routers that are physically linked to set up the PPI, as well as networking devices such as routers and/or gateways that may be configured at the external networks, are not shown in FIG. 6. ICP 154A establishes connectivity between an isolated virtual network (IVN) 602A set up for a customer A, and customer A's external network, using a private virtual network 652A and a virtual private gateway (VPG) 603A. As described earlier, IVN 602A may represent a set of resources of the provider network set aside for the customer A, over whose networking configuration (e.g., IP address assignments for the various resources, subnet configuration, routing and the like) the customer is granted substantial freedom. Thus, from a networking configuration perspective, IVN 602A may be considered the logical equivalent of a network set up within customer premises. At least some of the resources, such as compute instances, storage service nodes, or database nodes set up within IVN 602A may have private IP addresses that are not exposed or advertised on the public Internet; accordingly, the virtual interface 652A may be termed a private virtual interface. The virtual private gateway 603A may serve as a network concentrator on the provider network side of the path between A's external network and IVN 602A. In at least some embodiments, the VPG 603A may be linked to a corresponding customer gateway (not shown in FIG. 6) configured at customer A's external network. In at least some implementations, the appropriate routing table entries may have to be created and propagated to the VPG 603A before traffic can flow between the IVN 602A and the external network.

Customer B's external network may be connected to two different sets of resources in provider network 110 via respective interconnect partitions 154B and 154C of PPI 191 in the depicted embodiment. A private virtual interface 652B and a VPG 603B may be associated with ICP 154C to enable connectivity between IVN 602B and customer B's external network. A public virtual interface 653 may be associated with ICP 154B to connect a different set of devices at B's external network to a publicly-accessible set of service endpoints 612. The traffic of the private virtual interface 652B may be isolated from the traffic of the public virtual interface 653 (and from the traffic of private virtual interface 652A) using respective VLAN tags as mentioned earlier. Respective bandwidth limits (whose sum adds up to no more than the bandwidth capacity of the PPI 191) may be implemented for the three different ICPs in the depicted embodiment. In general, the same PPI 191 may be shared by an arbitrary number of ICPs 154, some of which may provide connectivity to IVNs using virtual private gateways, while others may provide connectivity to publicly-accessible resources of the provider network. In some embodiments, a given virtual private gateway may be shared among several different IVNs.

Methods for Configuring Connectivity Via Interconnect Partitions

Figure 7:
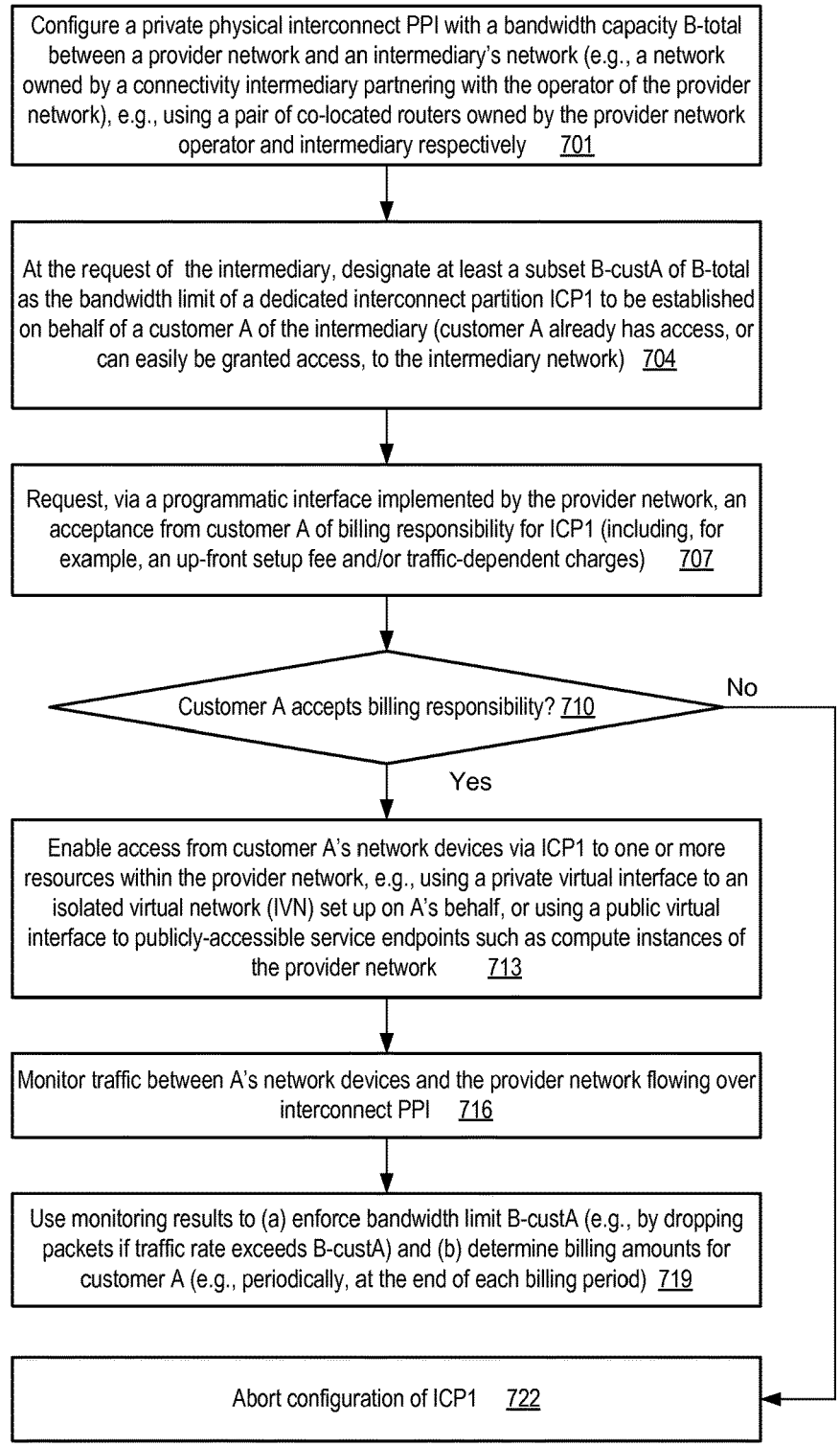
FIG. 7 is a flow diagram illustrating aspects of operations that may be performed to configure interconnect partitions, according to at least some embodiments.

FIG. 7 is a flow diagram illustrating aspects of operations that may be performed to configure interconnect partitions, according to at least some embodiments. As shown in element 701, a private physical interconnect (PPI) with a bandwidth capacity B-total may be established between a provider network and an intermediary network. The set-up of the PPI may, for example, comprise connecting a physical cable or cables at a router co-location facility between a router owned by the provider network and a router owned by a partner business entity that is interested in serving as a connectivity intermediary between the provider network and various customers. At the request of the connectivity intermediary, at least a subset B-custA of B-total may be designated as the bandwidth limit of a dedicated interconnect partition ICP1 to be established on behalf of a customer A of the intermediary (element 704). Customer A may already have access to the intermediary network because of a pre-existing business relationship between customer A and the intermediary (or it may be possible to quickly grant customer A network access to the intermediary network). For example, such access may be provided via a customer router or other network device that may also be located at the same co-location facility in some implementations, and may also be linked directly or indirectly to the intermediary's network.

In at least some embodiments, before network traffic flow between customer A's network and the provider network is enabled, the provider network operator may wish to ensure that billing responsibility for ICP1 is accepted by customer A. Accordingly, a programmatic interface such as a web-based console or a set of APIs may be implemented to request customers such as customer A to accept/confirm billing responsibility for ICP1 (or for a customer to indicate acceptance without an explicit request) (element 707). The billing responsibilities may, for example, include responsibility for an up-front setup cost for the ICP as well as responsibility for traffic-dependent charges. Customer A may either accept or reject the billing responsibility reject (as determined in element 710).

If customer A indicates/confirms acceptance of the billing responsibility, network access may be enabled between a set of devices of customer A, and some set of resources within the provider network via partition ICP1 of the PPI (element 713). The connectivity enablement may involve, for example, the establishment of a public or private virtual interface and/or a configuration of a virtual private gateway. For example, in the case where the set of resources within the provider network comprises an isolated virtual network (IVN) set up for customer A, which includes one or more resources with private IP addresses that are not accessible from the public Internet, both a private virtual interface and a virtual private gateway may be required in some embodiments. In contrast, a public virtual interface may be configured to enable access to publicly-accessible service nodes within the provider network such as compute instances with public IP addresses or storage service nodes with public IP addresses. In different embodiments, the configuration of the virtual interface may be initiated either by the connectivity intermediary, by the customer, or by either the intermediary or the customer. In some embodiments, the virtual interface and/or the virtual private gateway may be partly or fully configured proactively, prior to a determination whether the billing responsibility is accepted or rejected by the customer, so that the delay between the customer acceptance of billing responsibility and the enablement of traffic flow is reduced.

After the traffic flow is enabled over the PPI by implementing and/or propagating the necessary networking configuration changes, the traffic generated on behalf of customer A over the PPI may be monitored at various customer or provider network endpoints, or at nodes along the network paths between the endpoints (element 716). The results of the monitoring may be used for enforcing the bandwidth limit B-custA associated with ICP1, and/or to determine the bandwidth usage-dependent billing amount that customer A is to be charged in the depicted embodiment (element 719). To enforce the bandwidth limit, for example, packets may be dropped or queued if the measured traffic exceeds the limit B-custA during a given measurement time interval.

If the customer rejects billing responsibility for ICP1 (as also detected in element 710), the configuration of ICP1 may be aborted in the depicted embodiment. B-custA may be added back to the available bandwidth capacity of the PPI, for example, and any configuration steps that may have been performed to set up a virtual interface or a virtual private gateway may be undone.

Example Interface for Managing Interconnect Partitions

Figure 8:
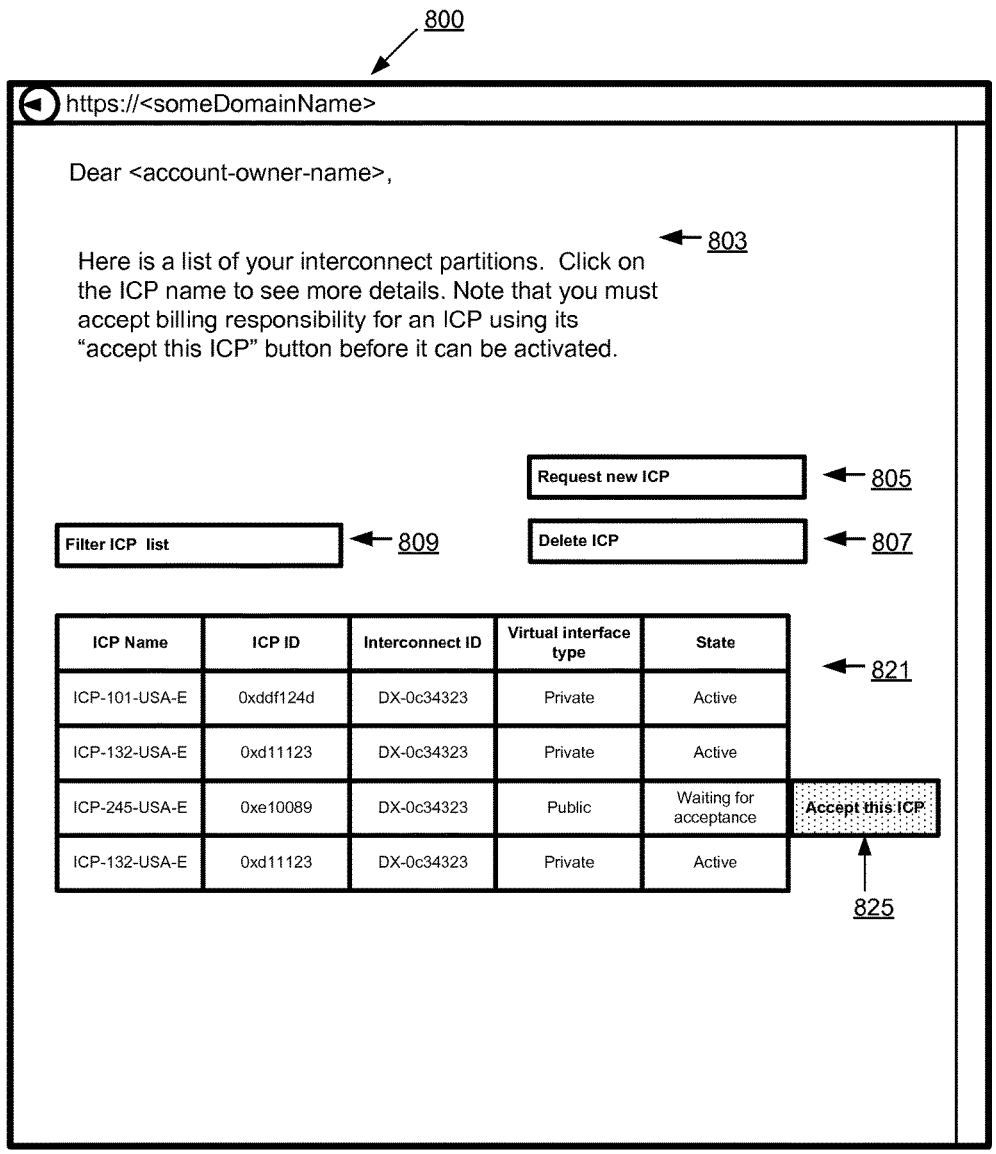
FIG. 8 illustrates an example web-based programmatic interface that may be used for interactions associated with interconnect partitions of a customer of a provider network, according to at least some embodiments.

FIG. 8 illustrates an example web-based programmatic interface that may be used for interactions associated with interconnect partitions of a customer of a provider network, according to at least some embodiments. As shown, the interface may comprise web page 800 with several regions and button controls, as well as a message area 803 in which guidelines are provided to the customer regarding the set of available operations on the interconnect partitions configured on the customer's behalf. In particular, the customer may be reminded via message area 803 in the example web page shown that before an ICP can be activated, the customer must explicitly accept billing responsibility for it.

Button 805 may be used to request the creation of a new ICP in the depicted embodiment. Button 807 may be used to delete an existing ICP. Button 809 may be uses to indicate filtering or search criteria for the list of customer ICPs displayed. Within region 821, one or more ICPs created on behalf of the customer may be displayed in accordance with the filtering criteria. For each ICP, a number of fields of information may be provided, including for example the name of the ICP, an identifier for the ICP, an identifier of the parent private physical interconnect (PPI), and an indication of the type of virtual interface that is associated with the ICP. In addition, in the depicted embodiment, the state of the ICP may also be indicated in region 821 (e.g., a state name corresponding one of the states illustrated in FIG. 5 may be shown). For ICPs that are currently awaiting acceptance (e.g., in the "ordered" state of FIG. 5), an additional button that can be clicked by the customer to indicate acceptance of billing responsibility may also be displayed (e.g., button 825 with the label "Accept this ICP"). Other controls and other fields may be included in different embodiments, and some of the fields and controls shown in FIG. 8 may not be implemented in at least some embodiments. In addition, the kinds of information displayed and controls implemented using web page 800 may also be made available via alternative programmatic interfaces such as APIs in at least some embodiments.

Pre-Configured Virtual Private Gateways

Figure 9:
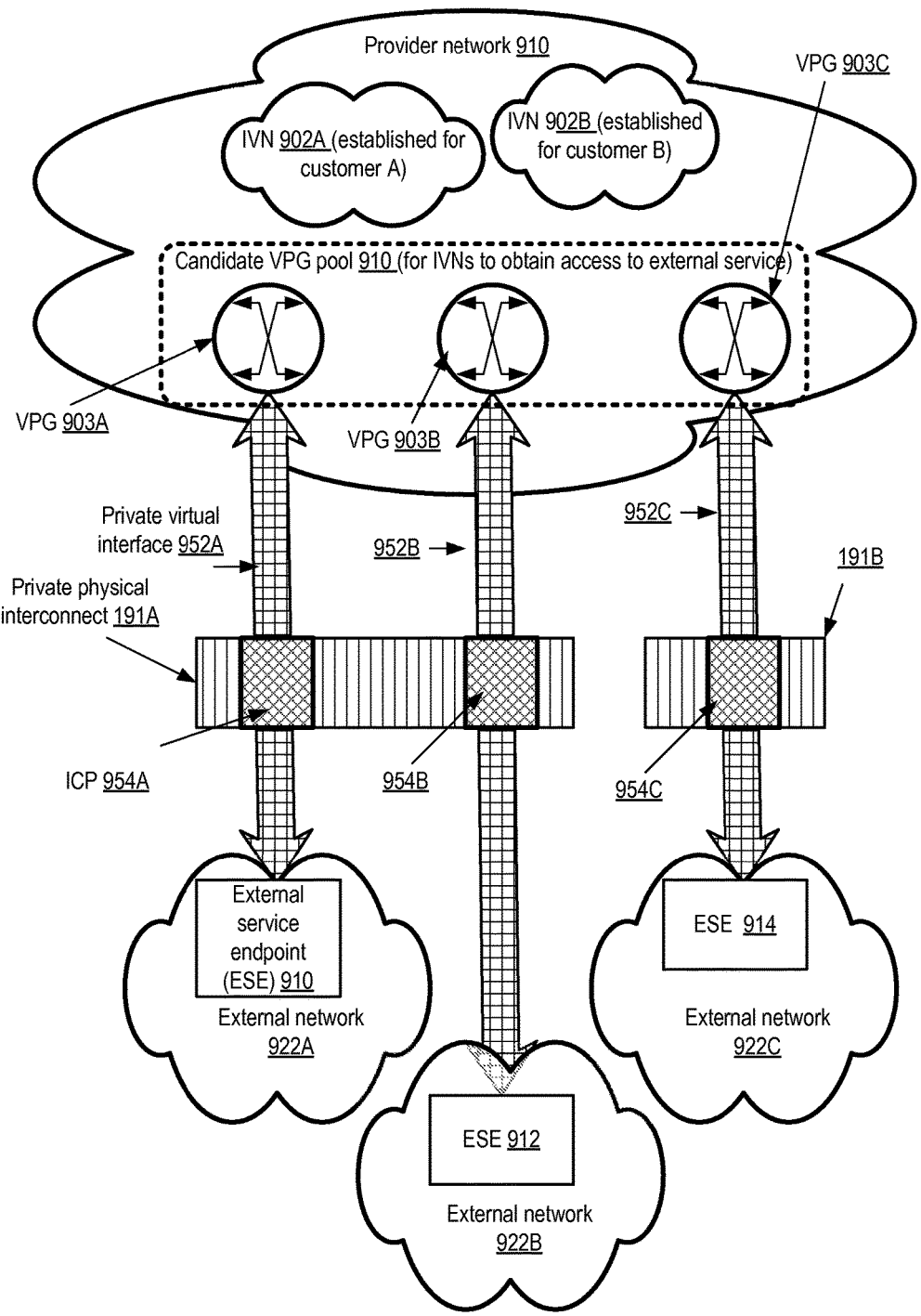
FIG. 9 illustrates an example system environment in which a pool of candidate virtual private gateways is established, such that each virtual private gateway is programmatically configurable (or "attachable") to one or more isolated virtual networks implemented at a provider network to provide connectivity via a private physical interconnect, according to at least some embodiments.

As indicated above, a number of networking configuration operations may be performed in various embodiments to allow a single PPI to be shared by several different customers—for example, respective ICPs, virtual interfaces and/or virtual private gateways may have to be configured to enable connectivity via a PPI between an isolated virtual network and an external network. In some embodiments, connectivity intermediaries may partially or fully pre-configure several of the logical and/or physical entities involved in providing connectivity via PPIs to external networks, including the ICPs, virtual interfaces and/or the virtual private gateways. FIG. 9 illustrates an example system environment in which a pool of candidate virtual private gateways is established, such that each virtual private gateway is programmatically configurable (or "attachable") to one or more isolated virtual networks implemented at a provider network to provide connectivity via a private physical interconnect, according to at least some embodiments.

Two isolated virtual networks (IVNs) 902A and 902B established on behalf of customer A and customer B respectively of provider network 910 are shown. Each IVN 902 may include a respective set of resources of provider network 910 assigned to the customer, such as various compute instances or virtual machines of a computing service implemented within the provider network, storage nodes of one or more storage services implemented within the provider network, and so on. As described earlier, the customer on whose behalf the IVN is established may be given substantial control over various aspects of the networking configuration of the IVN, including for example the assignment of IP addresses, subsets, routing table entries and the like. Thus, from a configuration control perspective, an IVN may be considered as the logical equivalent of a private network that the customer could have set up at customer premises, except that resources at the provider network's data center are used for the network rather than customer-owned resources. The network addresses of at least some devices of an IVN may not be accessible from the public Internet in some embodiments.

At the request of a connectivity intermediary, such as a business partner of the operator of the provider network 910, one or more private physical interconnects such as PPIs 191A and 191B may be configured in the embodiment depicted in FIG. 9 between the provider network and the intermediary's network, e.g., using co-located routers similar to those illustrated in FIG. 1. Via the PPIs 191 and one or more networking devices at the intermediary network, traffic may be allowed to flow between the IVNs 902 and external networks 922 (e.g., 922A, 922B or 922C) at which at least some of the functionality of one or more network-accessible services is implemented. (The intermediary's network, the co-located routers, and gateways or routers set up at the external networks 922 are not shown in FIG. 9.) In the depicted embodiment, two interconnect partitions (ICPs 954A and 954B) have been configured using PPI 191A, and one interconnect partition 954C has been established using PPI 191B. With respect to each PPI 191, some subset (or all) of the total bandwidth capacity of the interconnect may be designated as the bandwidth limit of each of the ICPs—for example, if PPI 191A has a capacity of 1 Gbit/sec, ICPs 954A and 954B may be assigned 200 Mbit/sec and 400 Mbit/sec as their respective limits in one scenario. A respective private virtual interface 952 has been pre-configured at the request of the connectivity intermediary for each of the ICPs—e.g., private virtual interface 952A (capable of linking provider network resources with external network 922A) associated with ICP 954A, private virtual interface 952B associated with ICP 954B and external network 922B, and private virtual interface 952C associated with ICP 954C and external network 922C. As described earlier, configuration of the virtual interfaces may require various parameters to be provided (e.g., by the connectivity intermediary), such as a VLAN identifier, an IP address or prefix, a BGP Autonomous System Number (ASN) or BGP key, and so on.

In addition, a set of virtual private gateways (VPGs) 903, including 903A, 903B and 903C may also be established at the request of the connectivity intermediary. One or more of the VPGs 903 may be associated with a respective private virtual interface and may be configurable to enable connectivity between IVNs 902 and external networks 922. A customer may be provided the option of programmatically selecting a particular VPG 903 from a pool 910 of available candidate VPGs, and programmatically attaching the selected VPG 903 to an IVN 902 to access one or more services being implemented at (or provided via) the external networks 922. For example, either the connectivity intermediary or a different business entity may implement a specialized network-accessible service, such as a storage service or a database service, using resources of an external network 922, and may include one or more pre-configured (or partially pre-configured) VPGs in a pool of candidate VPGs as a way of allowing customers to utilize the specialized service from the IVNs 902. If the VPG chosen by the customer is associated with an ICP 954 via a corresponding virtual interface 952, the implementer of the service may be able to provide some of the benefits of dedicated connectivity made possible by the underlying PPI, such as a guaranteed bandwidth (up to a bandwidth limit associated with the ICP), network path isolation, and so on.

At the request of a customer to whom an IVN 902 is assigned/allocated, the appropriate networking configuration changes may be made (e.g., by the connectivity intermediary, a connectivity coordinator or other administrative component of the provider network, or the implementer of the external service) to allow traffic to flow using a selected VPG 903 between the IVN 902 and one or more external service endpoints (ESEs) in the depicted embodiment. For example, access to ESE 910 at external network 922A may be enabled if the customer chooses VPG 903A, access to ESE 912 at external network 922B may be enabled using VPG 903B, and/or access to ESE 914 at external network 922C may be enabled using VPG 903C. The networking configuration changes may, for example, include the addition of appropriate route table entries and/or the selection of the VPG as a target for route propagation. The external service endpoints may include, for example, servers presenting web-service and/or other programmatic interfaces for service requests submitted from compute instances at the IVNs, or any of various types of networking devices such as routers or gateways established for access to the external services. In some embodiments, after a customer has selected a particular virtual private gateway for connectivity to some external service, a few additional configuration operations may be performed. The customer and the connectivity intermediary (or the provider network operator) may exchange information needed for the addition operations. The customer may, for example, wish to avoid using some particular network address ranges because those addresses may already be in use within the customer's IVN. In such a scenario, the customer may provide one or more configuration preferences regarding the VPG or the service endpoints, and the intermediary may perform the requested configuration changes on the VPG or at service endpoints. Similarly, the connectivity intermediary and/or the provider network operator may provide some suggestions for configuration settings (e.g., firewall settings changes at the like) that may be needed to be performed at a customer's IVN, and the customer may make the necessary configuration modifications prior to accessing the service. After the requested connectivity has been established, network packets may be transmitted using the selected VPG between various devices of the IVN and the external service endpoint.

A single PPI 191 (such as 191A) may be used to establish connectivity between respective IVNs and external service endpoints on behalf of a plurality of customers in some embodiments. A given IVN may be connected to a plurality of different external networks via one or more pre-configured virtual interfaces 952 and ICPs 954 in at least one embodiment. Multiple IVNs owned by different customers may access the same external network via a single shared VPG in some embodiments.

In at least some embodiments, the ability to access one or more external services from the IVNs by attaching to a selected pre-configured VPG may be advertised or promoted (e.g., as a reason to select the service instead of competing services) to the customers that own the IVNs. For example, in one embodiment a programmatically-accessible service marketplace may be implemented, in which various business entities promote network-accessible services available to current or potential customers of the provider network. The service may either be implemented at least in part using various resources of the provider network (e.g., compute instances for processing, storage services, networking devices and the like), or may be accessible from within the provider network (e.g., by accessing external service endpoints 910 or similar devices). A potential customer may search for various types of services via the marketplace, comparing functionality and pricing, and in at least some cases obtain access to a selected service from the marketplace. In some embodiments, for example, a service implementer may indicate using the marketplace that one or more of their services can be easily accessed from IVNs via pre-configured VPGs, with very little configuration required on the part of the customer. Thus, the ability to reduce service configuration overhead by selecting from among pre-configured VPGs may be used as a differentiating feature in such embodiments. In at least one embodiment, VPGs may be pre-configured to enable access to external services even if private physical interconnects are not used—e.g., at least some of the traffic associated with the service may flow over other types of interconnects or links, including links of the public Internet. In at least some embodiments, an indication of the route used for the customer's traffic if a given VPG is selected may be provided—for example, the customer may be informed that a PPI in a particular city would be used if gateway VPG1 is selected, and a PPI in a different city would be used if VPG2 is selected. In at least some embodiments, information on the bandwidth limits for connectivity via the VPGs (which may be dependent upon the bandwidth limits of the underlying ICPs and/or PPIs) may be provided to customers to help them select the appropriate VPGs. In at least some cases, the pricing policy associated with a given VPG may be based at least in part on the bandwidth limit.

Methods Utilizing Pre-Configured Virtual Private Gateways

Figure 10:
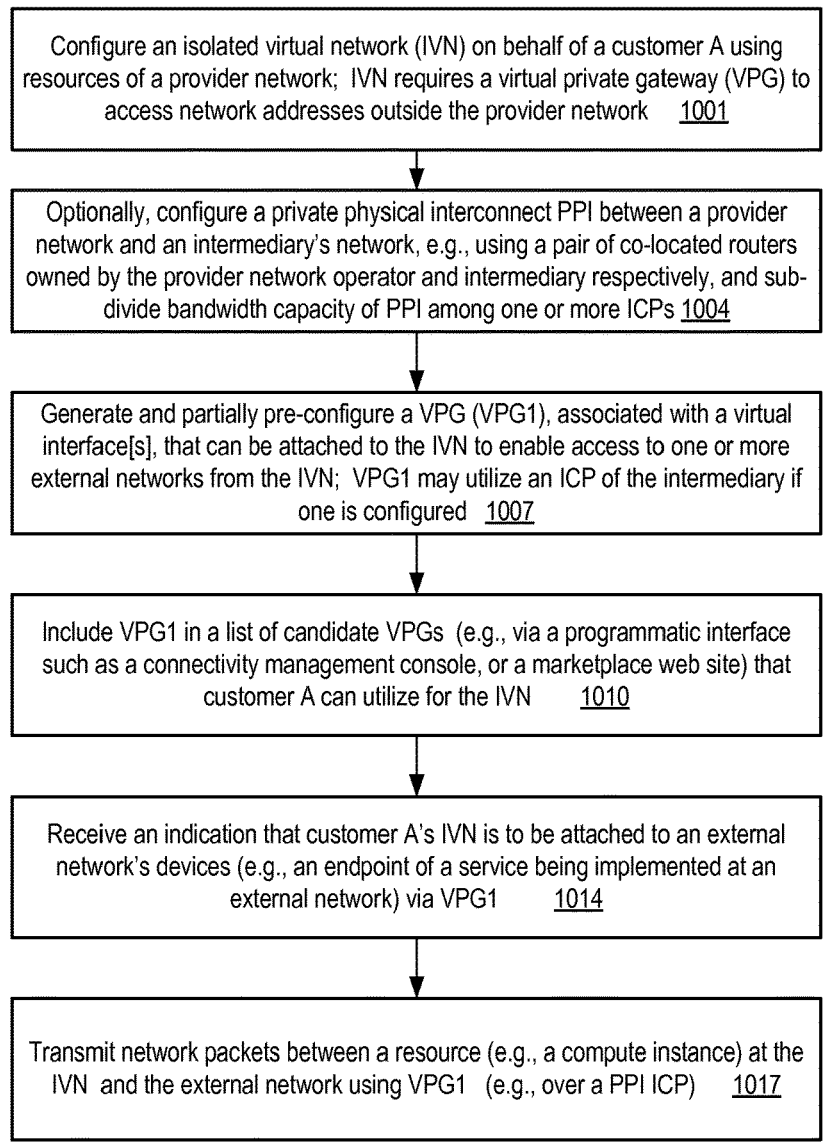
FIG. 10 is a flow diagram illustrating aspects of operations that may be performed to configure candidate virtual private gateways at a provider network at the request of a connectivity intermediary, according to at least some embodiments.

FIG. 10 is a flow diagram illustrating aspects of operations that may be performed to configure candidate virtual private gateways at a provider network at the request of a connectivity intermediary, according to at least some embodiments. As shown in element 1001, an IVN comprising a set of resources of a provider network may be configured on behalf of a customer A. The IVN may comprise at least some devices with private network addresses that are by default not accessible from outside the IVN or the provider network. The IVN may require a VPG to be set up in order to enable traffic to flow to and from network addresses outside the provider network.

Independently with respect to the IVN setup, a PPI may optionally be configured at the request of a connectivity intermediary between the provider network and the intermediary's network (element 1004). A pair of co-located routers, one owned by the provider network operator and one owned by the connectivity intermediary, may be physically linked via one or more cables to set up the PPI. A number of interconnect partitions (ICPs), each with a respective bandwidth limit corresponding to some subset of the bandwidth capacity of the PPI, may be set up, such that the sum of the bandwidth capacities of the different ICPs do not exceed the PPI bandwidth capacity.

A virtual private gateway VPG1 may be at least partially pre-configured, e.g., at the request of the connectivity intermediary, such that the customer A on whose behalf the IVN was established would be able to attach VPG1 to enable access to one or more external devices or networks outside the provider network (element 1007). VPG1 may be associated with a pre-configured virtual interface in at least some embodiments, and may utilize an ICP configured at the intermediary's request in at least some cases. VPG1 may be included in a list of candidate VPGs that customer A can utilize for the IVN (element 1010). Such a list may be made available to the customer via a variety of different programmatic interfaces in different embodiments, including for example a connectivity management console or a service marketplace implemented at the provider network. In at least some embodiments, secure VPNs (virtual private networks) using protocols such as IPSec (Internet Protocol Security), SSL/TLS (Secure Sockets Layer/Transport Layer Security), DTLS (Datagram Transport Layer Security) and the like may be set up between the IVNs and the external networks using the selected VPG at the provider network side.

An indication (such as a programmatic request from customer A) may be received that the IVN is to be connected to an external network (such as an endpoint of a service being implemented or exposed via the external network) via VPG1 (element 1014). The required network configuration operations may then be performed to enable network traffic to flow between the IVN and the external network, and network packets may be transmitted accordingly (element 1017). For example, routing table entries may be set up and propagated so that an ICP established at a PPI may be used for network packets flowing between the IVN and the external network. In some embodiments, some of the configuration operations to complete the connectivity establishment may be performed on the basis of information (such as address ranges to be excluded, or firewall setting changes required at IVNs) exchanged after the selection of VPG1 between the customer and either the provider network or the intermediary. It is noted that in different embodiments, at least some of the operations illustrated in the flow diagrams of FIG. 7 and/or FIG. 10 may be performed in a different order than shown, and some of the operations shown may be performed in parallel rather than sequentially. In some embodiments, some of the operations shown in the flow diagrams may not be required, or may be replaced by other operations.

Example Interfaces for Selecting and Using Virtual Private Gateways

Figure 11:
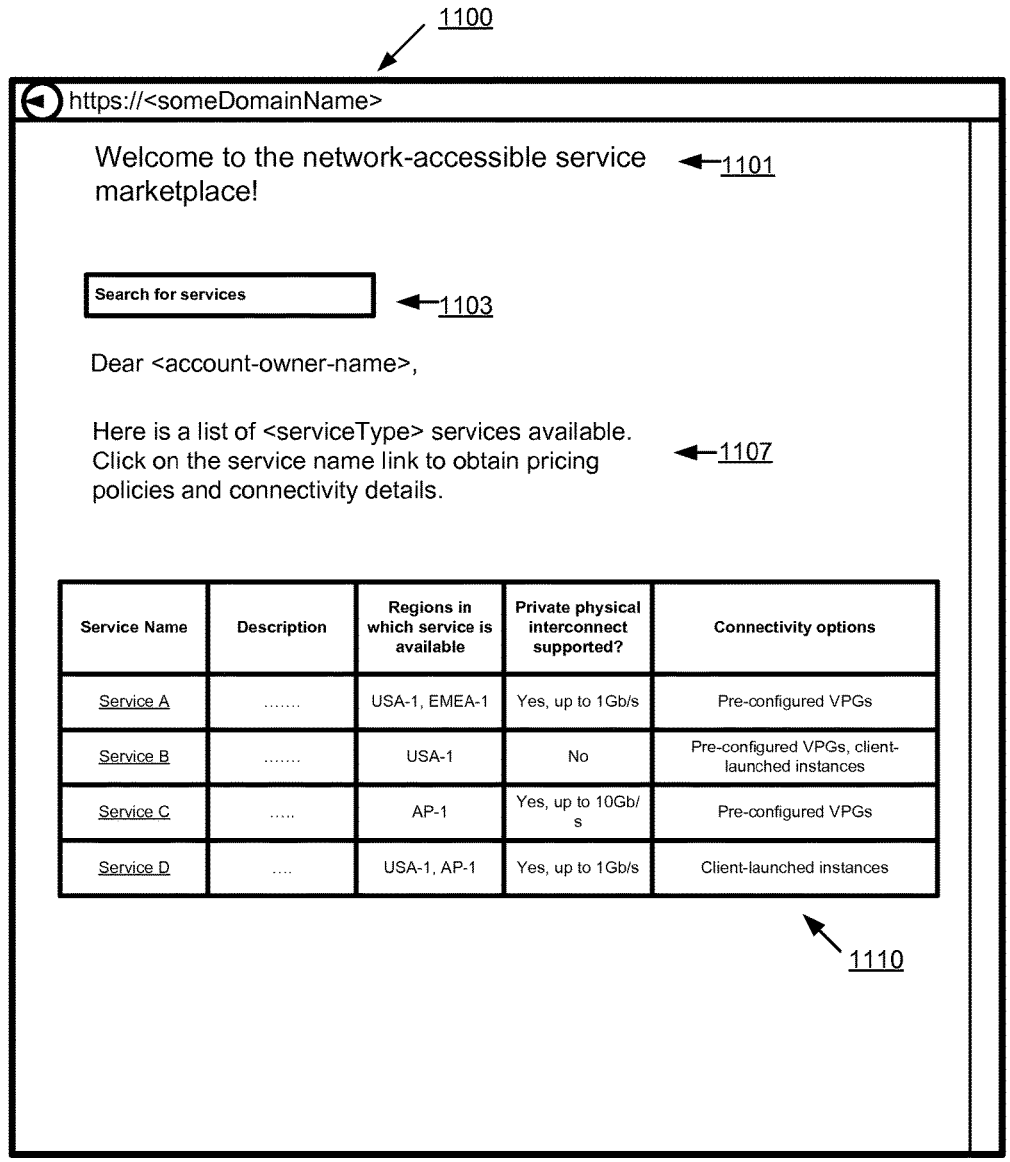
FIG. 11 illustrates an example web-based programmatic interface that may be used for a marketplace of services that can be accessed using pre-configured virtual private gateways, according to at least some embodiments.

In some embodiments, as mentioned earlier, connectivity intermediaries may establish candidate VPGs to enable potential customers that have IVNs to access various externally-hosted services (e.g., services that are implemented wither by the connectivity intermediaries themselves or by partners of the intermediaries). The availability of such VPGs may be indicated to customers via various programmatic interfaces in different embodiments, including for example interfaces set up for service marketplaces. FIG. 11 illustrates an example web-based programmatic interface that may be used for a marketplace of services that can be accessed using pre-configured virtual private gateways, according to at least some embodiments. As shown, the interface includes a web page 1100 comprising a welcome message 1101, a search filter interface element 1103, and a guidance message 1107 indicating the types of services that are listed in table 1110 in response to a submitted search request.

In the depicted example table 1110, a number of details regarding each service of a set of available services are provided. For example, the names and descriptions of the services are provided in the first two columns. Geographical regions (which may correspond to a location-based resource hierarchy implemented at the provider network) in which the services are available may be indicated in the table 1107 in some embodiments. For example, "Service A" is accessible from IVNs or other resources of the provider network located within regions "USA-1" and "EMEA-1" in the depicted example. Another column of table 1110, labeled "Private physical interconnect supported", may indicate whether a PPI is available for access to the service, and if so, the bandwidth limits of the PPIs. For example, connectivity at up to 1 Gbit/sec is available for service A. The rightmost column, labeled "Connectivity options" indicates whether pre-configured VPGs are available for the various services, or whether the client or customer has to launch compute instances in order to utilize a given service.

The customer viewing web page 1100 may obtain additional details regarding the various services, including the pricing policies of the services as well as details of available VPGs (if any), by clicking on the service name as indicated in guidance message 1107. In at least some embodiments, the ability to utilize pre-configured VPGs may serve as a differentiating feature for some of the services publicized via the marketplace. After the customer has selected a particular VPG, in some embodiments the VPG may be attached programmatically to the customer's IVN.

Figure 12:
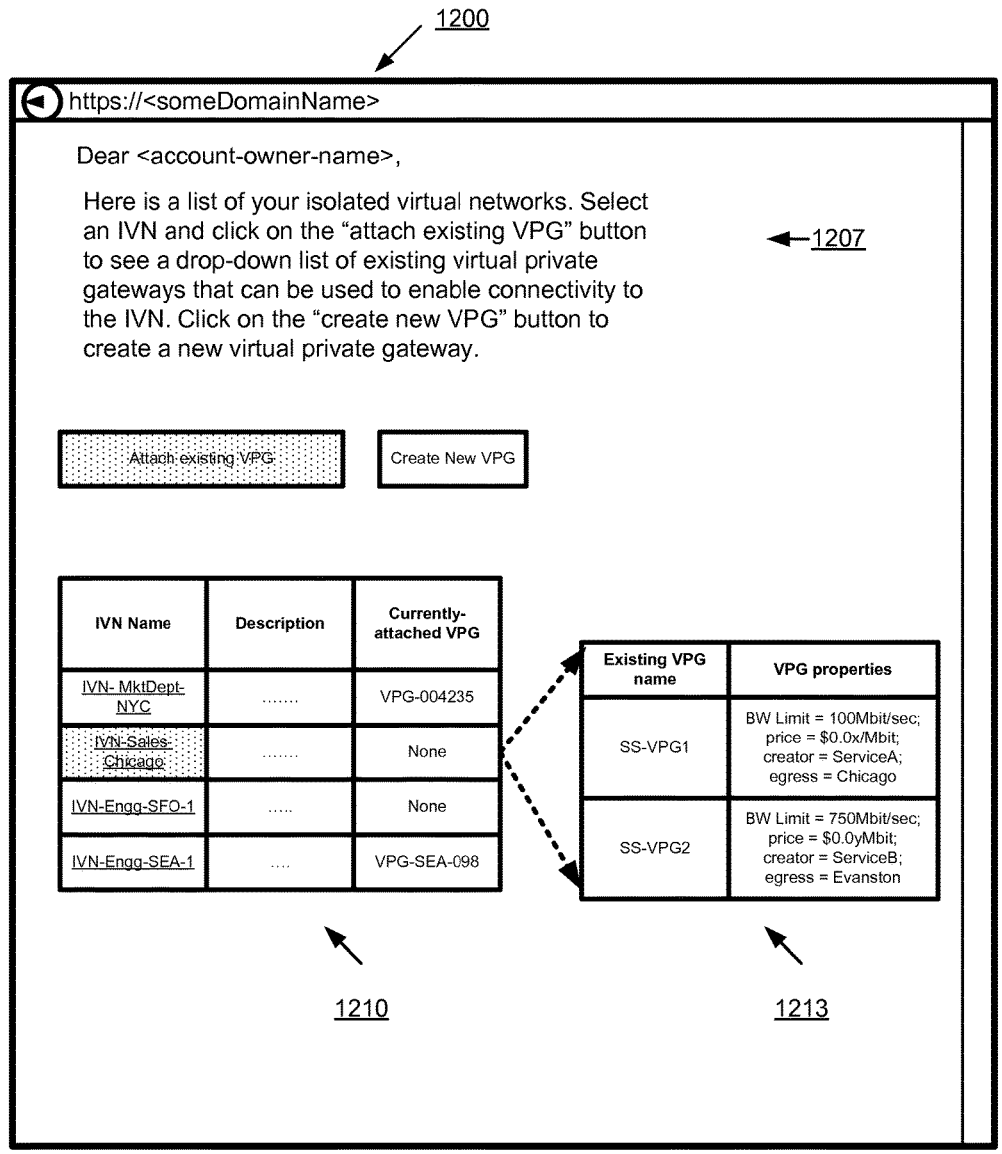
FIG. 12 illustrates an example web-based programmatic interface that may be used for selecting virtual private gateways for isolated virtual networks, according to at least some embodiments.

FIG. 12 illustrates an example web-based programmatic interface that may be used for selecting virtual private gateways for isolated virtual networks, according to at least some embodiments. As shown, the interface may comprise a web page 1200 including a message area in which a customer is advised to select and attach, for a given IVN, a VPG from among one or more candidate pre-configured VPGs.

In table 1210, a list of the customer's IVNs, their descriptions, and a column showing currently-attached VPGs is shown. As indicated by the shaded entry for the IVN named "IVN-Sales-Chicago" and the shaded button labeled "Attach existing VPG", the customer wishes to use the web page 1200 as depicted to select and attach a VOG for "IVN-Sales-Chicago". A pop-up 1213 with a list of available preconfigured VPGs and their respective features is shown. In the case of SS-VPG1, for example, the bandwidth limit is 100 Mbit/sec, the price is $0.0× per Megabit, the creator or owner of the VPG is a connectivity intermediary identified as "ServiceA", and the point of egress of the network path to the service (which may correspond to the location of the co-located routers used for an underlying PPI to be used for connectivity via GG-VPG1) is indicated as Chicago. Similar types of details are provided for the second available gateway SS-VPG-2. The customer may make a decision as to which of the available pre-configured VPGs are to be attached to IVN-Sales-Chicago programmatically, e.g., based on the pricing policies, the route or egress information, the reputation of the VPG creator/owner, the bandwidth limit, and so on. The set of candidate VPGs that are displayed may have been populated, for example, by one or more administrative components of the provider network at the request of the connectivity intermediaries "ServiceA" and "ServiceB". In some implementations, before the candidate VPGs associated with a particular service or intermediary is added to the list, the customer may have to programmatically indicate an interest in the service, e.g., by clicking on a link in a marketplace web page similar to that shown in FIG. 11.

Use Cases

The techniques described above, of establishing partitioned PPIs, and pre-configuring VPGs to allow network traffic flow between various devices inside and outside a provider network may be useful in a variety of environments and to a variety of business entities. From the perspective of provider network operators, the ability to enable partners (such as connectivity intermediaries) to promote and sell subsets of available PPI bandwidth capacity may help increase the appeal of the PPIs to a wider array of customers, as not all customers may be interested in or capable of utilizing the full bandwidth of typical PPIs. Requiring explicit acceptance from the customers of billing responsibilities for ICPs set up on their behalf may help to reduce billing-related ambiguities, and may also help to offset the costs incurred for PPI setup by connectivity intermediaries. For the connectivity intermediaries, the capability of connecting their customers to the various resources and services implemented within the provider network using dedicated network pathways may also help increase revenues and maintain high customer satisfaction levels. End customers would benefit from the reduction in configuration complexity associated with obtaining dedicated bandwidth—e.g., in embodiments in which the intermediary initiates or performs most or all of the steps to configure PPIs, ICPs, virtual interfaces and/or virtual private gateways.

Illustrative Computer System

Figure 13:
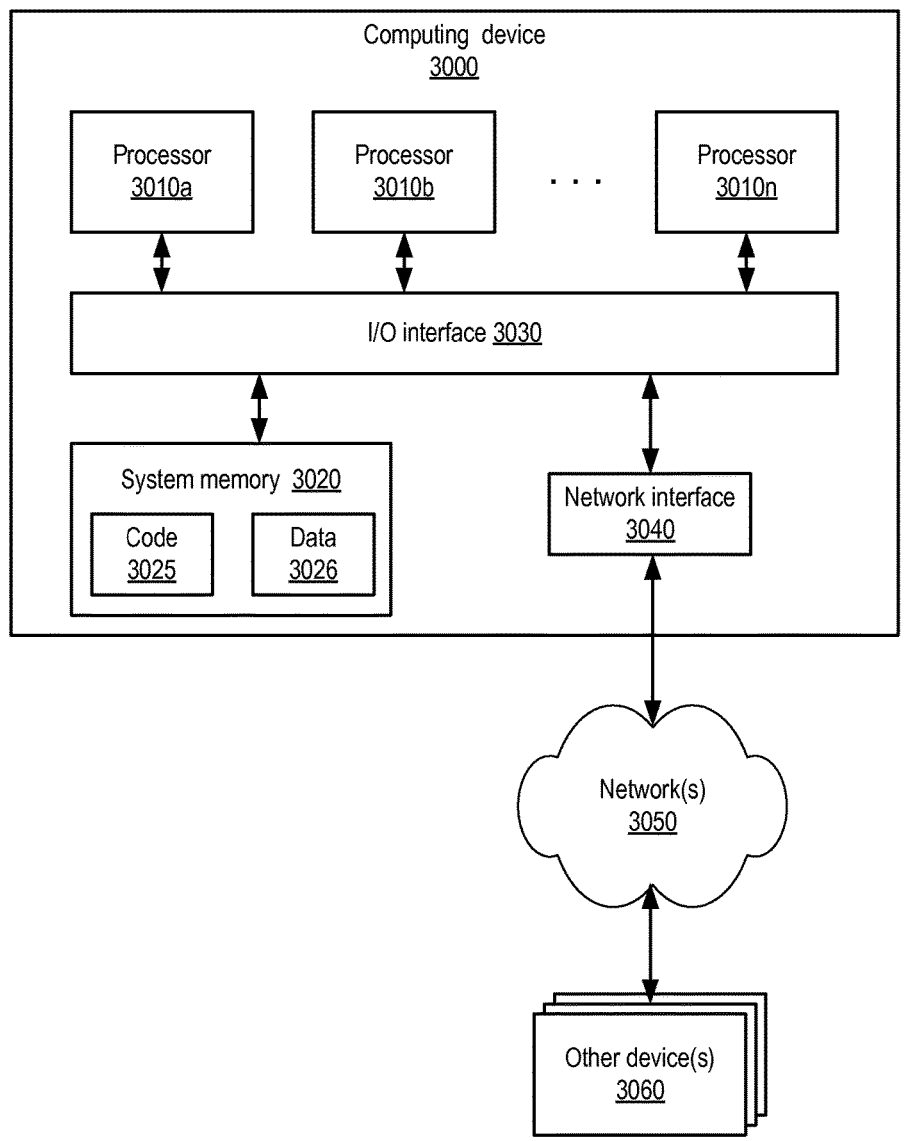
FIG. 13 is a block diagram illustrating an example computing device that may be used in at least some embodiments.

In at least some embodiments, a server that implements a portion or all of one or more of the technologies described herein, including the techniques to implement the various components of the connectivity coordinator or other administrative or non-administrative components of the provider network, networking resources such as virtual private gateways and the like, hosts at which compute instances or other resources of an IVN are implemented, may include a general-purpose computer system that includes or is configured to access one or more computer-accessible media. FIG. 13 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 12, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   a provider network comprising a plurality of computing devices configured to implement a plurality of resources of the provider network, wherein the plurality of resources comprises resources configured to be allocated to one or more customers of the provider network as compute resources, storage resources, or database resources; and
   one or more computing devices configured to:
      in response to a request from a connectivity intermediary, provide instructions for attaching one or more cables to a router of the provider network to establish the private physical interconnect between the provider network and an intermediary network of the connectivity intermediary to which the one or more customers of the connectivity intermediary have network access, wherein the intermediary network is a separate network from the provider network and is managed by a different entity than an entity that manages the provider network;
      designate, at the request of the connectivity intermediary, at least a portion of a bandwidth capacity of the private physical interconnect as a bandwidth limit of a dedicated interconnect partition established on behalf of a particular customer of the one or more customers;
      receive, at the provider network via a programmatic interface, an indication that the particular customer accepts billing responsibility for the interconnect partition;
      enable access to one or more resources of the provider network that are allocated to the particular customer, from one or more network devices of a customer network of the particular customer via the interconnect partition;
      monitor traffic between the one or more network devices of the customer network and the one or more resources of the provider network allocated to the particular customer; and
      utilize one or more results of the monitoring to (a) enforce the bandwidth limit of the interconnect partition and (b) determine a billing amount owed by the particular customer for a use of the interconnect partition.

2. The system as recited in claim 1, wherein, to enable access to the one or more resources, the one or more computing devices are further configured to:
   establish a virtual interface associated with the interconnect partition using a set of parameters received at the provider network, wherein the set of parameters includes one or more of: (a) a VLAN (virtual local area network) identifier, (b) an Internet Protocol (IP) address, (c) a Border Gateway Protocol (BGP) Autonomous System Number (ASN), or (d) a BGP key.

3. The system as recited in claim 2, wherein said virtual interface is established in response to a request from the connectivity intermediary.

4. The system as recited in claim 2, wherein said virtual interface is established in response to a request from the particular customer.

5. The system as recited in claim 2, wherein the one or more resources of the provider network allocated to the particular customer comprise a particular computing device of an isolated virtual network established at the request of the particular customer.

6. A method, comprising:
   performing, by one or more computing devices:
      providing, in response to a request from a connectivity intermediary, instructions for attaching one or more cables to a router of a provider network to establish a private physical interconnect between an intermediary network of the connectivity intermediary and the provider network, wherein the intermediary network is a separate network from the provider network and is managed by a different entity than an entity that manages the provider network;
      configuring an interconnect partition on behalf of a particular customer of the connectivity intermediary, wherein said configuring comprises designating, as a bandwidth limit of the interconnect partition, at least a portion of available bandwidth of the private physical interconnect between the provider network and the intermediary network, wherein a device of the particular customer is linked to the intermediary network;
      enabling access to one or more resources of the provider network allocated to the particular customer from the device of the particular customer via the private physical interconnect, wherein the one or more resources of the provider network allocated to the particular customer comprise one or more compute resources, one or more storage resources, or one or more database resources, implemented on computing devices of the provider network;
      monitoring traffic between the device of the particular customer and the one or more resources of the provider network allocated to the particular customer; and utilizing one or more results of said monitoring to enforce the bandwidth limit of the interconnect partition.

7. The method as recited in claim 6, further comprising performing, by the one or more computing devices:
configuring, to enable access to the one or more resources of the provider network allocated to the particular customer, a virtual interface using one or more of: (a) a VLAN (virtual local area network) identifier, (b) an Internet Protocol (IP) address, (c) a Border Gateway Protocol (BGP) Autonomous System Number (ASN), or (d) a BGP key.

8. The method as recited in claim 7, wherein said configuring the virtual interface is performed in response to a request from the connectivity intermediary.

9. The method as recited in claim 7, wherein said configuring the virtual interface is performed in response to a request from the particular customer.

10. The method as recited in claim 6, further comprising performing, by the one or more computing devices:
receiving, prior to said enabling, a confirmation at the provider network via a programmatic interface, that the particular customer accepts billing responsibility for the interconnect partition.

11. The method as recited in claim 10, further comprising performing, by the one or more computing devices:
determining a billing amount owed by the particular customer for the interconnect partition, comprising (a) a setup charge associated with establishing the interconnect partition and (b) a traffic dependent amount.

12. The method as recited in claim 6, wherein the one or more resources of the provider network allocated to the particular customer comprise a particular computing device of an isolated virtual network established at the request of the particular customer.

13. The method as recited in claim 6, wherein the one or more resources of the provider network allocated to the particular customer comprise a particular node of a network-accessible service, wherein the particular node is configured with a public IP address, and wherein the network-accessible service comprises one of: (a) a computing service, (b) a storage service, or (c) a database service.

14. The method as recited in claim 6, further comprising:
establishing, prior to said configuring the interconnect partition, the private physical interconnect between a co-located pair of routers comprising the router of the provider network and a router of the connectivity intermediary.

15. The method as recited in claim 6, further comprising performing, by the one or more computing devices:
receiving an interconnect partition metadata request pertaining to the private physical interconnect from the connectivity intermediary via a programmatic interface; and
providing, in response to the request, an indication of a plurality of interconnect partitions configured using the private physical interconnect, including the interconnect partition established on behalf of the particular customer and another interconnect partition established on behalf of a different customer of the connectivity intermediary.

16. A non-transitory computer-accessible storage medium storing program instructions that when executed on one or more processors:
provide instructions for attaching one or more cables to a router of a provider network to establish a private physical interconnect between an intermediary network of a connectivity intermediary and the provider network, wherein the intermediary network is a separate network from the provider network and is managed by a different entity than an entity that manages the provider network;
designate, as a bandwidth limit of an interconnect partition configured on behalf of a particular customer of the connectivity intermediary, at least a portion of available bandwidth of the private physical interconnect between the provider network and the intermediary network, wherein a device of the particular customer is linked to the intermediary network;
enable access to one or more resources of the provider network allocated to the particular customer from the device of the particular customer via the private physical interconnect, wherein the one or more resources of the provider network allocated to the particular customer comprise one or more compute resources, one or more storage resources, or one or more database resources, implemented on computing devices of the provider network; and
utilize one or more traffic monitoring results associated with the private physical interconnect to enforce the bandwidth limit of the interconnect partition.

17. The non-transitory computer-accessible storage medium as recited in claim 16, wherein the instructions when executed at the one or more processors:
configure, to enable access to the one or more resources allocated to the particular customer, a virtual interface using one or more of: (a) a VLAN (virtual local area network) identifier, (b) an Internet Protocol (IP) address, (c) a Border Gateway Protocol (BGP) Autonomous System Number (ASN), or (d) a BGP key.

18. The non-transitory computer-accessible storage medium as recited in claim 16, wherein the instructions when executed at the one or more processors:
receive, prior to enabling said access to one or more resources allocated to the particular customer, an indication at the provider network via a programmatic interface, that the particular customer accepts billing responsibility for the interconnect partition.

19. The non-transitory computer-accessible storage medium as recited in claim 16, wherein the one or more resources of the provider network allocated to the particular customer comprise a particular computing device of an isolated virtual network established at the request of the particular customer.

20. The non-transitory computer-accessible storage medium as recited in claim 16, wherein the one or more resources of the provider network allocated to the particular customer comprise a particular node of a network-accessible service, wherein the particular node is configured with a public IP address, and wherein the network-accessible service comprises one of: (a) a computing service, (b) a storage service, or (c) a database service.

* * * * *